(12) United States Patent
Gupta et al.

(10) Patent No.: US 9,717,110 B1
(45) Date of Patent: Jul. 25, 2017

(54) USER EQUIPMENT CENTRIC MOBILITY MANAGEMENT IN A MESH NETWORK

(71) Applicant: QUALCOMM INCORPORATED, San Diego, CA (US)

(72) Inventors: Piyush Gupta, Bridgewater, NJ (US); Junyi Li, Chester, NJ (US); Saurabha Tavildar, Jersey City, NJ (US)

( * ) Notice: Subject to any disclaimer, the term of this patent is extended or adjusted under 35 U.S.C. 154(b) by 0 days.

(21) Appl. No.: 15/206,031

(22) Filed: Jul. 8, 2016

Related U.S. Application Data

(60) Provisional application No. 62/308,575, filed on Mar. 15, 2016.

(51) Int. Cl.
H04W 28/02 (2009.01)
H04W 52/02 (2009.01)
(Continued)

(52) U.S. Cl.
CPC ............ *H04W 76/025* (2013.01); *H04B 3/36* (2013.01); *H04H 20/38* (2013.01); *H04L 45/026* (2013.01);
(Continued)

(58) Field of Classification Search
CPC ............... H04W 76/025; H04W 4/005; H04W 72/0413; H04W 52/0274; H04W 72/042;
(Continued)

(56) References Cited

U.S. PATENT DOCUMENTS 9,178,772 B2 11/2015 Dasgupta et al.
2004/0230638 A1 11/2004 Balachandran et al.
(Continued)

FOREIGN PATENT DOCUMENTS

EP 2833694 A2 2/2015
WO WO-2007008857 A2 1/2007
(Continued)

OTHER PUBLICATIONS

M. M Taneja, A Framework for Power Saving in IoT Networks, 2014, IEEE, 2014 International Conference on Advances in Computing,Communications and Informatics (ICACCI), pp. 369-375.*

(Continued)

*Primary Examiner* — Mohammad Adhami
*Assistant Examiner* — Shailendra Kumar
(74) *Attorney, Agent, or Firm* — Qualcomm IP Dept.; James Hunt Yancey, Jr.

(57) ABSTRACT

Systems and methods are disclosed for efficient signaling between devices. A leaf device initiates association with chirp signals to relay devices. Relay devices respond with keep alive signals. The leaf device selects a relay (from those that responded) and associates with it. Alternatively, selection of the relay may be offloaded to a base station. In another embodiment, an available relay device transmits a discovery broadcast to leaf devices. A leaf device responds with a chirp signal to the relay and association occurs. After association, the leaf device periodically sends a chirp signal and the relay responds with a keep alive signal. If either device fails to send its signal, link breakage is assumed. The leaf device reverts to uplink communication with a base station while searching for another relay. Downlink paging may be synchronized with the chirp/keep alive signaling. Other aspects, embodiments, and features are also claimed and described.

30 Claims, 11 Drawing Sheets

(51) Int. Cl.
*H04W 76/02* (2009.01)
*H04B 3/36* (2006.01)
*H04L 12/751* (2013.01)
*H04H 20/38* (2008.01)
*H04W 72/04* (2009.01)
*H04W 4/00* (2009.01)
*H04L 12/933* (2013.01)
*H04W 88/02* (2009.01)

(52) U.S. Cl.
CPC ......... *H04L 49/1584* (2013.01); *H04W 4/005* (2013.01); *H04W 52/0274* (2013.01); *H04W 72/042* (2013.01); *H04W 72/0413* (2013.01); *H04W 88/02* (2013.01)

(58) Field of Classification Search
CPC ...... H04W 88/02; H04B 3/36; H04L 49/1584; H04L 45/026; H04H 20/38
See application file for complete search history.

(56) References Cited

U.S. PATENT DOCUMENTS

| | | | |
|---|---|---|---|
| 2006/0215581 A1 | 9/2006 | Castagnoli et al. | |
| 2009/0092049 A1 | 4/2009 | Hargrave et al. | |
| 2009/0322488 A1* | 12/2009 | Kanagala | H04W 52/0229 340/10.3 |
| 2013/0322388 A1* | 12/2013 | Ahn | H04W 76/023 370/329 |
| 2015/0078198 A1 | 3/2015 | Estevez et al. | |
| 2015/0113154 A1 | 4/2015 | Nguyen et al. | |
| 2015/0138977 A1* | 5/2015 | Dacosta | H04W 28/021 370/235 |
| 2015/0172387 A1 | 6/2015 | Ge et al. | |
| 2015/0181620 A1 | 6/2015 | Seok | |
| 2015/0312953 A1 | 10/2015 | Wang et al. | |
| 2016/0029359 A1* | 1/2016 | Agiwal | H04W 76/066 370/329 |
| 2016/0050635 A1* | 2/2016 | Choi | H04W 52/383 370/254 |
| 2016/0066137 A1 | 3/2016 | Kulkarni et al. | |
| 2016/0150373 A1 | 5/2016 | Kim et al. | |
| 2016/0174148 A1* | 6/2016 | Seed | H04W 52/0216 370/311 |
| 2016/0249390 A1 | 8/2016 | Hans et al. | |
| 2016/0295565 A1* | 10/2016 | Kim | H04W 72/04 |

FOREIGN PATENT DOCUMENTS

| | | |
|---|---|---|
| WO | WO-2015002508 A2 | 1/2015 |
| WO | WO-2015006636 A1 | 1/2015 |
| WO | WO-2015191995 A1 | 12/2015 |

OTHER PUBLICATIONS

Devasenapathy S., et al., "Between Neighbors: Neighbor Discovery Analysis in EH-IoTs," 10th International Conference on Autonomic Computing (ICAC '13), 2013, pp. 193-200.
Non-Final Office Action issued in corresponding U.S. Appl. No. 15/206,082 on Jan. 13, 2017.
International Search Report issued in PCT/US2017/017378 on May 19, 2017.
Written Opinion issued in PCT/US2017/017378 on May 19, 2017.
International Search Report and Written Opinion—PCT/US2017/017267—ISA/EPO—May 8, 2017.

* cited by examiner

USER EQUIPMENT CENTRIC MOBILITY MANAGEMENT IN A MESH NETWORK

CROSS-REFERENCE TO RELATED APPLICATIONS

The present application claims the benefit of U.S. Provisional Patent Application No. 62/308,575, filed Mar. 15, 2016, and entitled "User Equipment Centric Mobility Management in a Mesh Network," the disclosure of which is incorporated by reference herein in its entirety.

TECHNICAL FIELD

This application relates to wireless communications systems, and in particular to managing mobility of low power Internet of Everything devices using a mesh network. Embodiments enable and provide efficient network deployment based on dynamic conditions as well as efficient use of power resources.

INTRODUCTION

Wireless communication networks function to allow general purpose devices such as cellular phones, personal digital assistants (PDAs), and laptops to transmit and receive information reliably and on demand. In addition, more and more devices with proprietary functions are being designed with internet connectivity in mind. These devices are known as "internet of everything" (IOE) devices. They can include, for example, household appliances, location beacons, or status monitors for remotely located facilities. Some IOE devices are designed to function for very long periods of time—weeks, months, or even years—on a battery, without access to another power source. In these applications there is a need for minimizing the power consumed by radio communications with the IOE device. Systems typically employ sleep cycles during which an IOE device's transceivers are powered down to reduce power consumption. The IOE device has an internally stored schedule that instructs the device to wake up its transceivers in time to listen for potential data transmissions.

In some use cases, an IOE device may not have a consistent communications channel open to a base station, and a mesh network may be employed to allow other devices (whether IOE or other) to act as a relay to the base station. For example, a utility meter in a basement may not be able to reliably reach a base station, and instead use another IOE device above the basement as a relay to communicate with the base station. In other cases, a mobile IOE device may move out of range of a relay IOE device, or vice versa, requiring the mobile IOE device to find a new relay IOE device to maintain communication with the base station. This presents a unique challenge with respect to mobility management and downlink paging for IOE devices that employ sleep cycles to save power, as the IOE devices coordinate during their relatively short awake cycles.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the invention, a method of wireless communication includes sending, from a first wireless communications device, a chirp signal to one or more second wireless communications devices in a mesh network during a first wake-up period common to the first wireless communications device and to the one or more second wireless communications devices. The method further includes receiving, at the first wireless communications device, a keep alive signal from a determined relay wireless communications device from among the one or more second wireless communications devices during the first wake-up period. The method further includes receiving, at the first wireless communications device, connection setup information from the determined relay wireless communications device during the first wake-up period, the connection setup information comprising resource allocation information, wherein the first wireless communications device is asleep at a time that overlaps a sleep time of the one or more second wireless communications devices.

In an additional aspect of the invention, a method of wireless communication includes receiving, at a first wireless communications device from a second wireless communications device in a mesh network, a chirp signal in a wake-up period. The method further includes sending, from the first wireless communications device to the second wireless communications device, a keep alive signal during the wake-up period based on the first wireless communications device being a determined relay for the second wireless communications device. The method further includes sending, from the first wireless communications device to the second wireless communications device, connection setup information that comprising resource allocation information.

In an additional aspect of the invention, a method of wireless communication includes receiving, at a first wireless communications device, a chirp signal from a relay wireless communications device that serves as a relay for a second wireless communications device in a mesh network. The method further includes determining, at the first wireless communications device, that a downlink page is pending for the second wireless communications device. The method further includes sending, from the first wireless communications device to the relay wireless communications device, connection setup information and the downlink page in response to the determination.

In an additional aspect of the invention, a first wireless communication device includes a processor configured to generate a chirp signal and a transceiver coupled to the processor and configured to send the chirp signal to one or more second wireless communications devices in a mesh network during a first wake-up period common to each device. The transceiver is further configured to receive a keep alive signal from a determined relay wireless communications device from among the one or more second wireless communications devices during the first wake-up period. The transceiver is further configured to receive connection setup information from the determined relay wireless communications device during the first wake-up period, the connection setup information comprising resource allocation information.

In an additional aspect of the invention, a first wireless communication device includes a processor configured to generate a keep alive signal and a transceiver configured to receive, from a second wireless communications device in a mesh network, a chirp signal in a wake-up period. The transceiver is further configured to send, to the second wireless communications device, the keep alive signal during the wake-up period based on the first wireless communications device being a determined relay for the second wireless communications device. The transceiver is further configured to send, to the second wireless communications device, connection setup information that comprises resource allocation information.

In an additional aspect of the invention a first wireless communication device includes a transceiver configured to receive a chirp signal from a relay wireless communications device that serves as a relay for a second wireless communications device in a mesh network and a processor configured to determine that a downlink page is pending for the second wireless communications device. The transceiver is further configured to send, to the relay wireless communications device, connection setup information and the downlink page in response to the determination.

In an additional aspect of the invention, a computer-readable medium having program code recorded thereon includes code for causing a first wireless communication device to send a chirp signal to one or more second wireless communications devices in a mesh network during a first wake-up period, code for causing the first wireless communication device to receive a keep alive signal from a determined relay wireless communications device from among the one or more second wireless communications devices during the first wake-up period, and code for causing the first wireless communication device to receive connection setup information from the determined relay wireless communications device during the first wake-up period, the connection setup information comprising resource allocation information.

In an additional aspect of the invention, a computer-readable medium having program code recorded thereon includes code for causing a first wireless communication device to receive, from a second wireless communications device in a mesh network, a chirp signal in a wake-up period, code for causing the first wireless communication device to send, to the second wireless communications device, the keep alive signal during the wake-up period based on the first wireless communications device being a determined relay for the second wireless communications device, and code for causing the first wireless communication device to send, to the second wireless communications device, connection setup information that comprises resource allocation information.

In an additional aspect of the invention, a computer-readable medium having program code recorded thereon includes code for causing a first wireless communication device to receive a chirp signal from a relay wireless communications device that serves as a relay for a second wireless communications device in a mesh network, code for causing the first wireless communication device to determine that a downlink page is pending for the second wireless communications device, and code for causing the first wireless communication device to send, to the relay wireless communications device, connection setup information and the downlink page in response to the determination.

In an additional aspect of the invention, a first wireless communication device includes means for sending a chirp signal to one or more second wireless communications devices in a mesh network during a first wake-up period, means for receiving a keep alive signal from a determined relay wireless communications device from among the one or more second wireless communications devices during the first wake-up period, and means for receiving connection setup information from the determined relay wireless communications device during the first wake-up period, the connection setup information comprising resource allocation information.

In an additional aspect of the invention, a first wireless communication device includes means for receiving, from a second wireless communications device in a mesh network, a chirp signal in a wake-up period, means for sending, to the second wireless communications device, a keep alive signal during the wake-up period based on the first wireless communications device being a determined relay for the second wireless communications device, and means for sending, to the second wireless communications device, connection setup information that comprises resource allocation information.

In an additional aspect of the invention, a first wireless communication device includes means for means for receiving a chirp signal from a relay wireless communications device that serves as a relay for a second wireless communications device in a mesh network, means for determining that a downlink page is pending for the second wireless communications device, and means for sending, to the relay wireless communications device, connection setup information and the downlink page in response to the determination.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
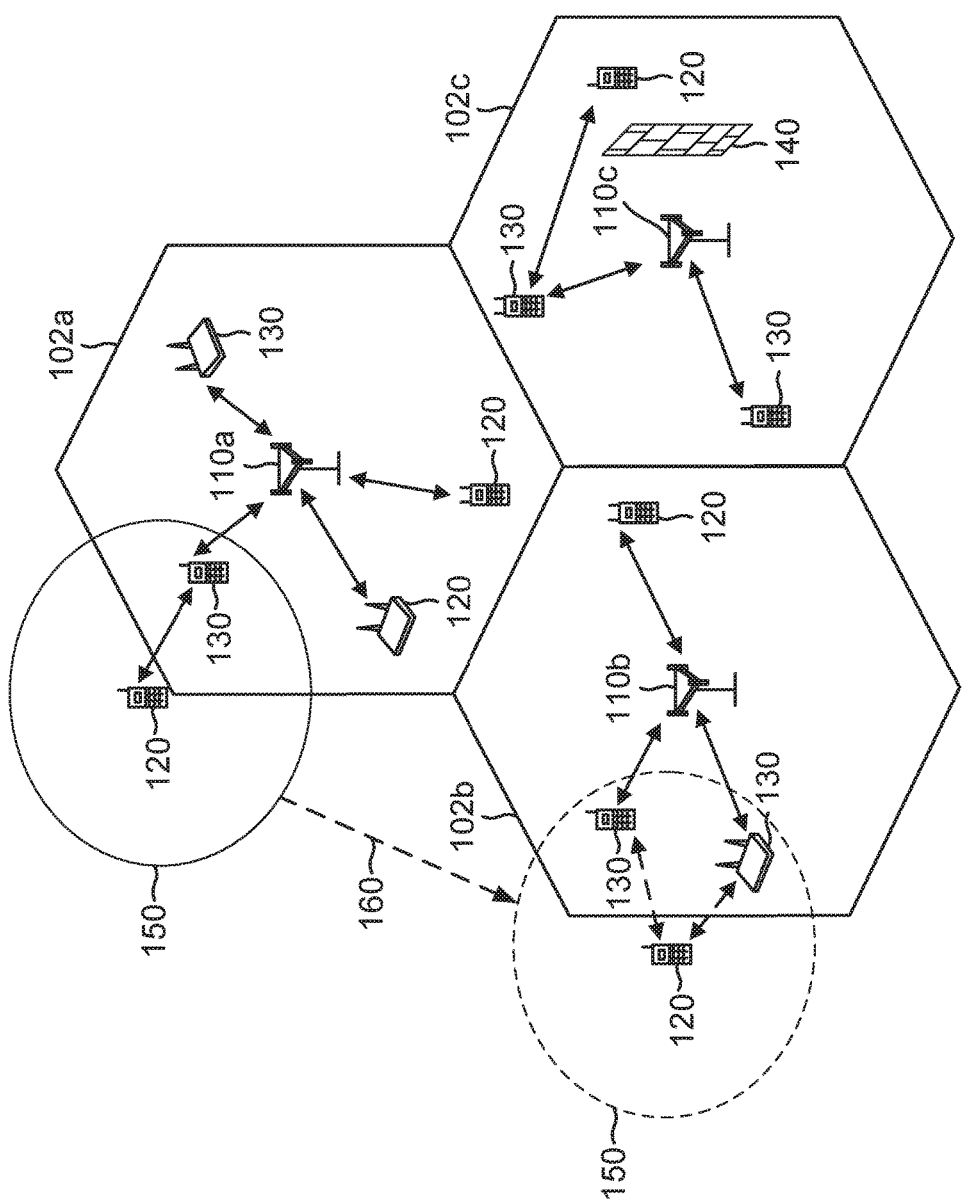
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to manage the mobility and downlink paging of IOE devices in a manner that provides more efficient signaling (e.g., improving energy efficiency). Leaf IOE devices may refer to those devices that rely on other devices to relay signals between them and a destination base station. Relay IOE devices may refer to devices that provide relay services to the leaf IOE devices. Relay IOE devices may be IOE devices or other types of user equipment (UE) that do not have the same power constraints/targets as IOE devices. Further, a relay IOE device may itself be a leaf IOE device from the perspective of another relay IOE device, thereby forming a mesh network with one or multiple hops between leaf and target base station. For purposes of simplicity, reference will be made herein to leaf IOE devices as those that seek relay assistance, and relay IOE devices as those that offer relay assistance, regardless of their position in an overall mesh network.

In an embodiment, a leaf IOE device may transmit discovery chirp signals to one or more potential relay IOE devices when the leaf IOE device has data to transmit. In an embodiment, each relay IOE device that receives the discovery chirp and can respond does so with respective keep alive signals, so that the leaf IOE device potentially receives multiple keep alive signals from one or more relay IOE devices. The leaf IOE device may then analyze these different keep alive signals, and/or any measured metrics associated with (or included in) those keep alive signals to make a selection. Upon selecting one of the relay IOE devices to use as its relay, the leaf IOE device sends a selection signal to that particular relay IOE device. In response, the relay IOE device may send a connection setup message including parameters that are then used to complete the association. Alternatively, to further reduce signaling overhead between the leaf and relay IOE devices, selection of the relay may be offloaded to the serving base station. For example, the relay IOE devices, upon receiving discovery chirp signals, may transmit a list of candidate leaf IOE devices (e.g., one or more for each relay IOE device that received discovery chirp signals) to their serving base station. The base station may then make the determination of which relay IOE devices will associate with which leaf IOE devices seeking relays, and transmit this determination back to the selected relay IOE device(s). In turn, the selected relay IOE device sends a keep alive and connection setup message (e.g., in the same message or one after the other), and the leaf and relay IOE devices complete association.

In another embodiment, available relay IOE devices may utilize discovery broadcasts (instead of discovery chirps from the leaf IOE devices) to trigger associations. For example, an available relay IOE device may transmit its discovery broadcast to leaf IOE devices within range. A leaf IOE device that receives the discovery broadcast, and determines to associate with that particular relay IOE device, responds with a chirp signal that includes identifying information and, in some embodiments, a predicted uplink periodicity of traffic (e.g., over time). In such embodiments, the chirp sent in response to the discovery broadcast is directed specifically to the relay IOE device for which association is sought. In response, the relay IOE device sends a keep alive connection setup message and association may complete.

Under any of the above association approaches, after association is made the leaf IOE device may periodically send a chirp signal to its associated relay IOE device. These may be sent once every multiple transmission periods (e.g., a periodicity selected to balance mobility latency versus overhead considerations). In response, the associated relay IOE device sends a keep alive signal, confirming that the connection is still active. This may be sent in the same wake up period that the chirp was sent, or in a subsequent defined period.

So long as the link remains good, the chirps and keep alive messages will continue. Should the relay IOE device stop receiving the chirps when expected, it will determine that a link breakage between the two has occurred. Should the leaf IOE device not receive a keep alive message from the relay IOE device, it will determine that a link breakage has occurred. In this situation, the leaf IOE device may attempt to revert back to uplink direct communication with a base station (e.g., a base station from which it may receive downlink information but that otherwise imposes too much power burden). In this way, the leaf IOE device may attempt to continue to meet any communication needs while it searches for another relay IOE device. Once a new relay IOE device is located (for example, by accessing a list of possible relay IOE devices it maintains based on a prior history of discovery broadcasts), the leaf IOE device may send a chirp signal and attempt association as discussed above. Should a new association occur, the new relay IOE device may notify the relay's base station of the new association. The new base station may, in turn, notify the "old" base station that served the prior relay IOE device.

In further embodiments, downlink paging may be synchronized with the chirp/keep alive signaling between IOE devices. For example, when a leaf IOE device sends its scheduled chirp, and the relay IOE device sends its scheduled keep alive signal, the relay IOE device may also send a chirp to the serving base station and receive a keep alive signal. The base station may also at this time determine that a page should be sent to the leaf IOE device receiving relay service from the relay IOE device. After sending the keep alive signal, or together with it, the base station may send a connection setup and leaf downlink page to the associated relay IOE device, which the relay IOE devices stores until it can reach the leaf IOE device again. During the next wake up period, when the leaf IOE device sends another chirp, the relay IOE device may respond with a keep alive signal again and then, or together with it, send the connection setup and leaf downlink page on to the leaf IOE device, thereby completing the downlink page.

FIG. 1 illustrates a wireless communication network 100 in accordance with various aspects of the present disclosure. In an embodiment, the wireless communication network 100 may include one or more mesh networks in communication with each other and/or one or more core networks. The wireless network 100 may include a number of base stations 110. A base station 110 may include an evolved Node B (eNodeB or eNB) in the LTE context, for example. A base station may also be referred to as a base transceiver station or an access point. For simplicity of discussion, it will be referred to herein as a base station. It will be recognized that there could be one to many base stations, as well as be an assortment of different types such as macro, pico, femto base stations, and/or other devices that include at least some capabilities of a base station.

The base stations 110 communicate with "internet of everything" (IOE) devices 120 and 130 as shown. IOE devices 120/130 may be an example of types of user equipment (UE). One or more of the IOE devices 120/130 may also be referred to as "internet of things" (IoT) devices with corresponding functionality; reference will be made herein to IOE devices for simplicity of discussion.

In some embodiments, IOE devices 120 are referred to as "leaf" IOE devices 120 in a mesh network and IOE devices 130 are referred to as "relay" IOE devices in a mesh network to specifically describe their respective functionality according to embodiments of the present disclosure. Leaf IOE devices 120 may send data and/or receive data via one or more relay IOE devices 130. Relay IOE devices 130 may act as relay between one or more leaf IOE devices 120 and one or more base stations 110. Leaf IOE devices 120 and relay IOE devices 130 may either be stand-alone or integrated within other devices. The leaf IOE devices 120 and/or relay IOE devices 130 may capture information that is then relayed to a remote system, such as via a base station 110 (and/or one or more relay IOE devices 130). One or both of leaf IOE devices 120 and relay IOE devices 130 may have limited power resources because they are integrated with other devices or objects, such as to render those devices or objects "smart," and be expected to be able to operate for long periods of time without replacement or recharge, e.g. days, weeks, months, or years. Each of the leaf IOE devices 120 and relay IOE devices 130 may awake at predefined time intervals according to a pre-determined schedule in order to decrease their power consumption.

As shown in FIG. 1, base station 110a may communication with the leaf IOE devices 120 and relay IOE devices 130 that are within the cell 102a, the base station 110b may communicate with the leaf IOE devices 120 and relay IOE devices 130 within the cell 102b, and the base station 102c may communicate with the leaf IOE devices 120 and relay IOE devices 130 within the cell 102c. These cells are exemplary only; a given network environment may include any number of base stations 110 and corresponding cells 102. An IOE device 120 or 130 may communicate with a base station 110 via an uplink and a downlink. The downlink (or forward link) refers to the communication link from a base station 110 to an IOE device 120 or 130. The uplink (or reverse link) refers to the communication link from an IOE device 120 or 130 to a base station 110. It will be recognized that the devices communicating with a given base station 110 may include a mix of both an IOE device 120 or 130 as well as other types of UEs such as mobile phones or other types of mobile computing devices.

The leaf IOE devices 120 and relay IOE devices 130 and UEs may be dispersed throughout the wireless network 100, and each IOE device 120 or 130 may be stationary or mobile. A UE or IOE may also be referred to as a terminal, a mobile station, a subscriber unit, etc. Some particular examples of an IOE 120 or 130 may be a GPS location beacon, an implanted heartrate monitor, a utility meter, a weather monitor, a drone, an entertainment device, a hub, a gateway, an appliance, a wearable, peer-to-peer and device-to-device components/devices (including fixed, stationary, and mobile), IoT devices, etc. The wireless communication network 100 is one example of a network to which various aspects of the disclosure apply.

The leaf IOE devices 120 and relay IOE devices 130 may form a mesh network wherein leaf IOE devices 120 associate with one or more relay IOE devices 130, which relay signals between leaf IOE devices 120 and base stations 110. As will be further described below, there are various ways that the leaf IOE devices 120 may be paired up with relay IOE devices 130 for association. The choice of which relay IOE device 130 to associate with a leaf IOE device 120 may be performed by the leaf IOE device 120 or by the base station 110.

In an embodiment, there may be an obstruction between a leaf IOE device 120 and a base station 110 that prevents a direct link between the two, illustrated as an obstruction 140 in cell 102c in FIG. 1. For example, a leaf IOE device 120 in the basement of a building (e.g., monitoring a utility) may not have a clear signal to a base station 110, such that the ground around the basement serves as an obstruction 140. A relay IOE device 130 aboveground, however, may have a connection to a base station 110, and the leaf IOE device 120 may connect to the relay IOE device 130, which in turn connects to the base station 110 to relay data to and from the leaf IOE device 120, allowing the leaf IOE device 120 to communicate with the base station 110 via the relay IOE device 130.

In another example, a leaf IOE device 120 may not have any notable obstructions 140 between itself and a base station 110, but may instead be out of range to successfully connect to the base station 110 without an intermediary. For example, a leaf IOE device 120 may have a range 150, as shown in FIG. 1, that covers a relay IOE device 130 but does not reach the base station 110a. In some embodiments, the leaf IOE device 120 may be within a downlink range of a base station 110a while not in an uplink range 150. The relay IOE device 130 in cell 102a is illustrated as being within range of both the leaf IOE device 120 and the base station 110, and therefore may relay communications between the leaf IOE device 120 and the relay IOE device 130. Furthermore, a relay IOE device 130 may connect to one or more other relay IOE devices 130 to form a link to a base station 110.

In another embodiment, a leaf IOE device 120 may be mobile, for example moving along a path 160 in the illustrated example of FIG. 1. As the leaf IOE device 120 moves along path 160, it may move out of range of the relay IOE device 130 in the cell 102a, thus losing its link to base station 110a. As will be further described below, the leaf IOE device 120 recognizes that it has lost its link with the relay IOE device 130 and searches for either another relay IOE device 130 to reassociate with or a base station 110 to directly connect to. Shown in phantom is a position of a leaf IOE device 120 when it searches for new relay IOE devices 130 to associate with. In this case there are two relay IOE devices 130 within range 150 of the leaf IOE device 120 when it searches. As will be further described below, the leaf IOE device 120 may select one of the available relay IOE devices 130 to associate with based on various parameters.

In the above embodiments, a leaf IOE device 120 may send and receive signals directly to and from a particular relay IOE device 130 or indirectly to and from the particular relay IOE device 130 via one or more other relay IOE devices 130. In a similar manner, a relay IOE device 130 may send and receive signals directly to and from a base station 110 or a leaf IOE device 120, or the relay IOE device 130 may send and receive signals indirectly to and from the base station 110 or the leaf IOE device 120 via a one or more other relay IOE devices 130.

Figure 2:
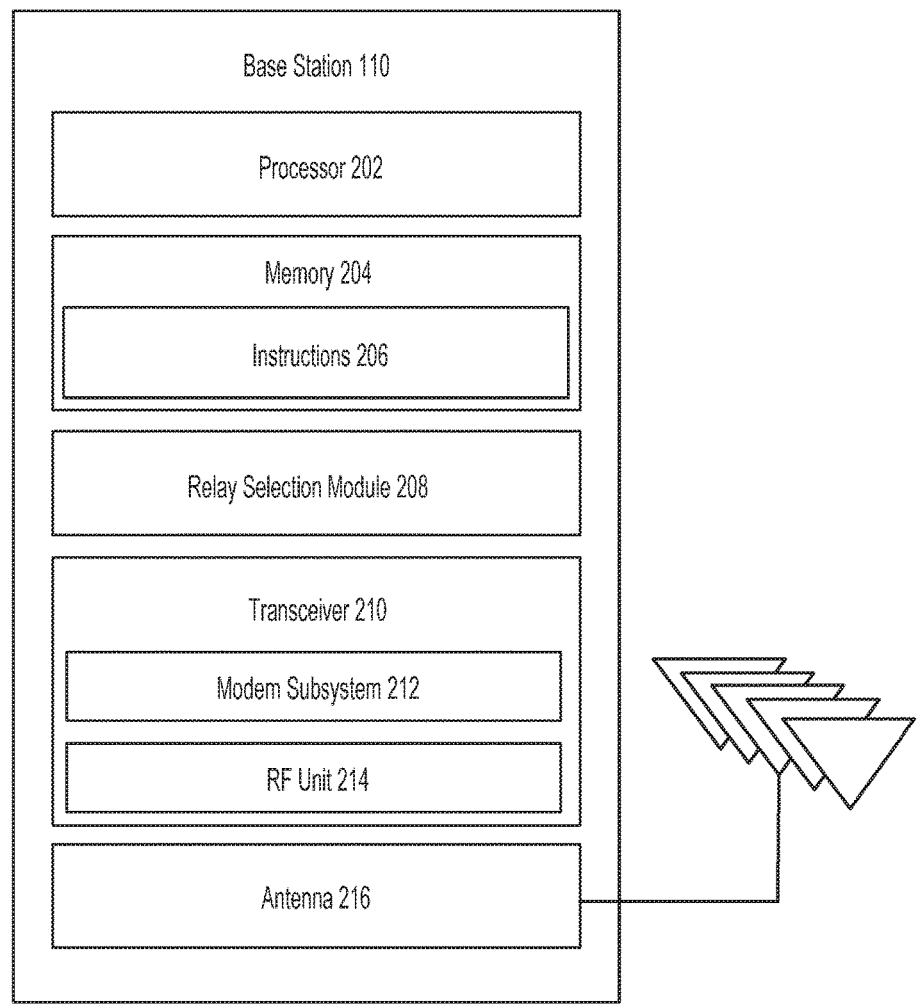
FIG. 2 is a block diagram illustrating an exemplary wireless communications device in accordance with various aspects of the present disclosure.

FIG. 2 is a block diagram of an exemplary base station 110 according to embodiments of the present disclosure. The base station 110 may include a processor 202, a memory 204, a relay selection module 208, a transceiver 210, and an antenna 216. These elements may be in direct or indirect communication with each other, for example via one or more buses. As mentioned above with respect to FIG. 1, the base station 110 may communicate with multiple UEs, such as leaf IOE devices 120 and/or relay IOE devices 130.

The processor 202 may include a central processing unit (CPU), a digital signal processor (DSP), an application-specific integrated circuit (ASIC), a controller, a field-programmable gate array (FPGA) device, another hardware device, a firmware device, or any combination thereof configured to perform the operations described herein with reference to the base station 110 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 302), random access memory (RAM), magnetoresistive random access memory (MRAM), read-only memory (ROM), programmable read-only memory (PROM), erasable programmable read-only memory (EPROM), electronically erasable programmable read-only memory (EEPROM), flash memory, a solid state memory device, one or more hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the base station 110 in connection with embodiments of the present disclosure. Instructions 206 may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Figure 5A:
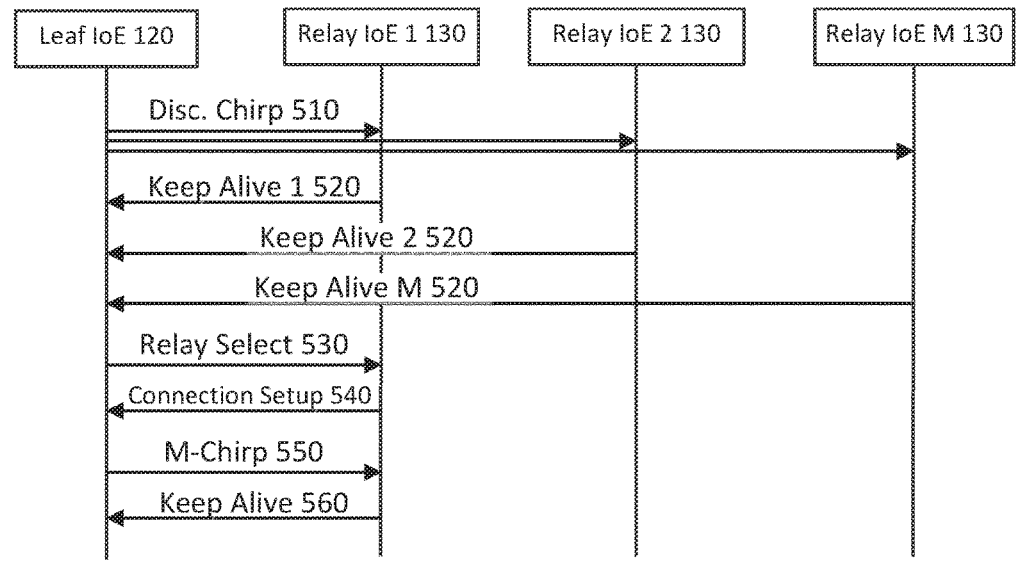
FIG. 5A is a protocol diagram illustrating exemplary signaling aspects between leaf devices and relay devices in accordance with various aspects of the present disclosure.
Figure 5B:
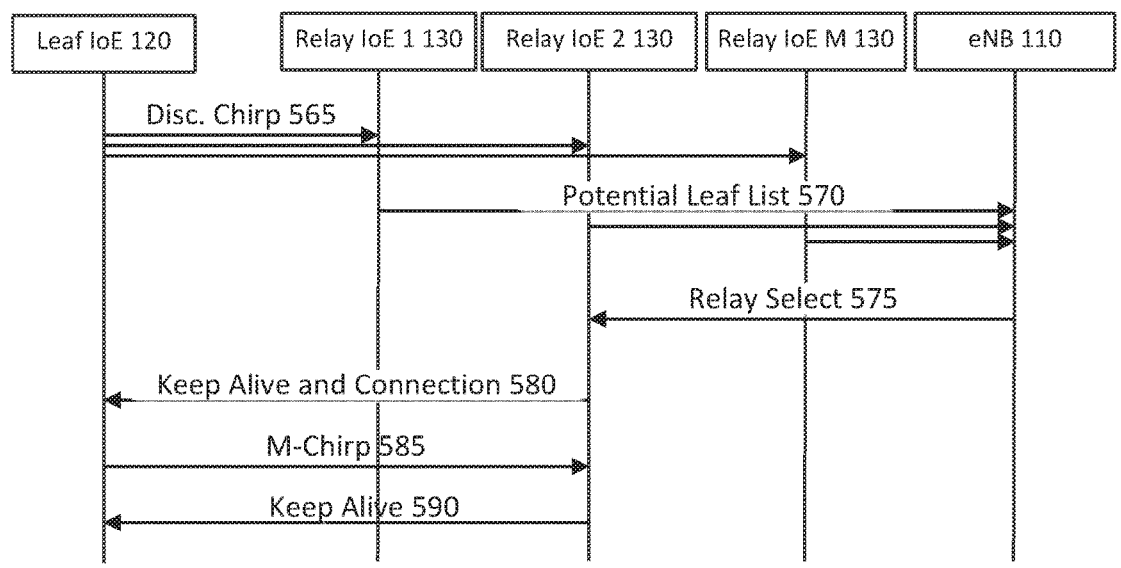
FIG. 5B is a protocol diagram illustrating exemplary signaling aspects between leaf devices and relay devices in accordance with various aspects of the present disclosure.

The relay selection module 208 of the base station 110 may be used, in some embodiments, to choose a relay IOE device 130 to associate with a leaf IOE device 120, as shown in FIG. 5B and discussed further below. The relay selection module 208 of base station 110 may be used to process information contained in a potential leaf lists received from relay IOE devices 130 (e.g., as those relay IOE devices 130 receive relay requests from leaf IOE devices 120 that result in the list) that the base station 110 serves to choose which relay IOE devices 130 to associate with each leaf IOE device 120.

For example, the relay selection module 208 may consider various parameters such as the total energy consumption from the leaf IOE device 120 to the base station 110, the number of relay IOE devices 130 used to reach base station 110 from leaf IOE device 120, whether the awake cycles of the leaf IOE devices 120 and relay IOE devices 130 overlap, or the like. These parameters may be included by the relay IOE device 130 in the potential leaf list, or they may be inferred from the parameters that are included in the potential leaf list. Based on this consideration, the relay selection model 208 may choose a relay IOE device 130 to associate with a leaf IOE device 120.

The transceiver 210 may include a modem subsystem 212 and a radio frequency (RF) unit 214. The transceiver 210 is configured to communicate bi-directionally with other devices, such as one or more leaf IOE devices 120 and relay IOE devices 130. The modem subsystem 212 may be configured to modulate and/or encode data according to a modulation and coding scheme (MCS), e.g., a low-density parity check (LDPC) coding scheme, a turbo coding scheme, a convolutional coding scheme, etc. The relay selection module 208 may instruct the transceiver 210 to send the relay selection information to relay IOE devices 130. The relay selection signal may also include information such as an identifier for the leaf IOE device 120 to allow the recipient of the relay selection signal to know which leaf IOE device 120 sent the signal.

The RF unit 214 may be configured to process (e.g., perform analog to digital conversion or digital to analog conversion, etc.) modulated/encoded data from the modem subsystem 212 (on outbound transmissions) or transmissions originating from another source such as a leaf IOE device 120 or a relay IOE device 130. Although shown as integrated together in transceiver 210, the modem subsystem 212 and the RF unit 214 may be separate devices that are coupled together at the base station 110 to enable the base station 110 to communicate with other devices.

The RF unit 214 may provide the modulated and/or processed data, e.g. data packets, to the antenna 216 for transmission to one or more other devices such as leaf IOE device 120 and relay IOE device 130. After the transceiver 210 receives data for transmission, e.g. a relay selection signal, the modem subsystem 212 may modulate and/or encode the data in preparation for transmission. The RF unit 214 may receive the modulated and/or encoded data packet and process the data packet prior to passing it on to the antenna 216. This may include, for example, transmission of data messages to one or more leaf IOE devices 120 or relay IOE devices 130 according to embodiments of the present disclosure. The antenna 216 may further receive data messages transmitted from a leaf IOE device 120 and/or relay IOE device 130, and provide the received data messages for processing and/or demodulation at the transceiver 210. As illustrated, the antenna 216 may include multiple antennas of similar or different designs in order to sustain multiple transmission links, although other antenna configurations including a single antenna may also be used.

Figure 3:
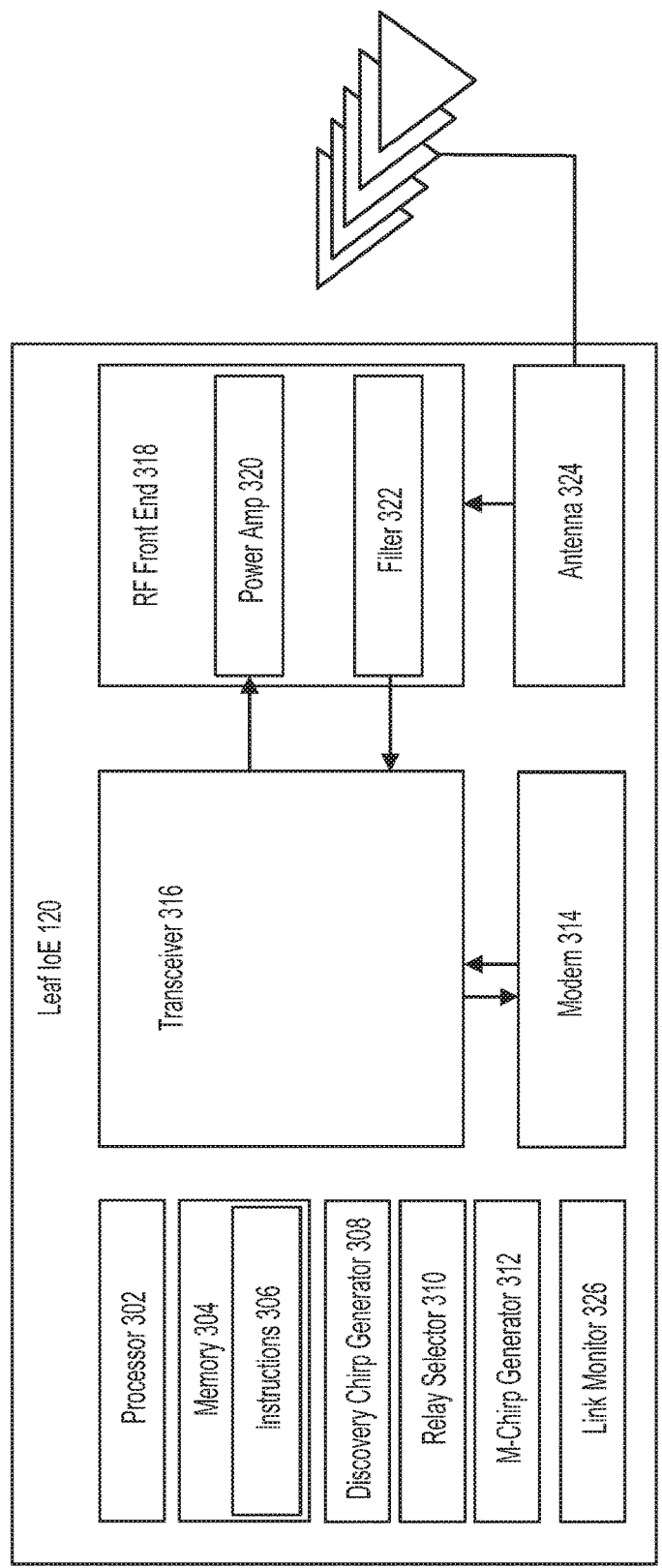
FIG. 3 is a block diagram illustrating an exemplary wireless communications device in accordance with various aspects of the present disclosure.

FIG. 3 is a block diagram of an exemplary leaf IOE device 120 according to embodiments of the present disclosure. The leaf IOE device 120 may include a processor 302, a memory 304, a discovery chirp generator 308, a relay selection module 310, a "Mesh-chirp" (M-chirp) generator 312, a link monitoring module 314, a modem 314, a transceiver 316, an RF front end 318, and an antenna 324. These elements may be in direct or indirect communication with each other, for example via one or more buses. As mentioned above with respect to FIG. 1, the leaf IOE device 120 may communicate with relay IOE devices 130 that are within range, other leaf IOE devices 120 within range, as well as base stations 110 that are within range.

The processor 302 may include a CPU, a DSP, an ASIC, a controller, a FPGA device, another hardware device, a firmware device, or any combination thereof configured to perform the operations described herein with reference to the leaf IOE device 120 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the leaf IOE device 120 in connection with embodiments of the present disclosure.

The discovery chirp generator 308 may be configured to generate a discovery chirp signal, such as discovery chirp signal 510 as shown in FIGS. 5A and 5B and discussed further below. The discovery chirp signal is used to locate potential relay IOE devices 130 or base stations 110 within range 150 of the leaf IOE device 120. The discovery chirp signal may request that any relay IOE devices 130 or base stations 110 that receive the discovery chirp signal respond with the information useful for the relay selection module 310 to select a relay IOE device 130 for association. This information may include parameters such as the energy consumption from the relay IOE device 130 to the base station 110, the number of additional relay IOE devices 130 required to reach base station 110 from the relay IOE device 130, the timing of awake cycles of the relay IOE device 130, or the like. Once the discovery chirp signal is generated, it may be passed to the modem subsystem 308 for encoding.

The relay selection module 310 may be configured to choose, out of a selection of one or more relay IOE devices 130 within range 150 of leaf IOE device 120, the best relay IOE device 130 to associate with in order to communicate with a base station 110 in the mesh network 100. As described above, the leaf IOE device 120 may receive various parameters from potential relay IOE devices 130, including the energy consumption from the relay IOE device 130 to the base station 110, the number of additional relay IOE devices 130 required to reach base station 110 from the relay IOE device 130, the timing of awake cycles of the relay IOE device 130, or the like. These parameters may be gathered by the leaf IOE device 120 in response to a discovery chirp signal sent by the leaf IOE device 120 to potential relay IOE devices 130, by receipt of discovery broadcasts sent by potential relay IOE devices 130 to all leaf IOE devices 120 within range, or by other appropriate requests or broadcasts.

This information may be used by the relay selection module 310 to determine parameters such as the total energy consumption from the leaf IOE device 120 to the base station 110, the number of relay IOE devices 130 required to reach base station 110 from leaf IOE device 120, whether the awake cycles of the leaf IOE devices 120 and relay IOE devices 130 overlap, or the like. The relay selection module 310 may, for example, seek to minimize total energy consumption, but may choose to prioritize overlapping awake cycles of the leaf IOE device 120 and the relay IOE device 130. Once a relay IOE device 130 has been selected for association, the relay selection module 310 may further generate a relay selection signal, such as relay selection signal 530 of FIG. 5A, to be sent to the selected relay IOE device 130 to begin association between the leaf IOE device 120 and the relay IOE device 130. Once the relay selection signal is generated, it may be passed to the modem subsystem 308 for encoding.

Figure 6:
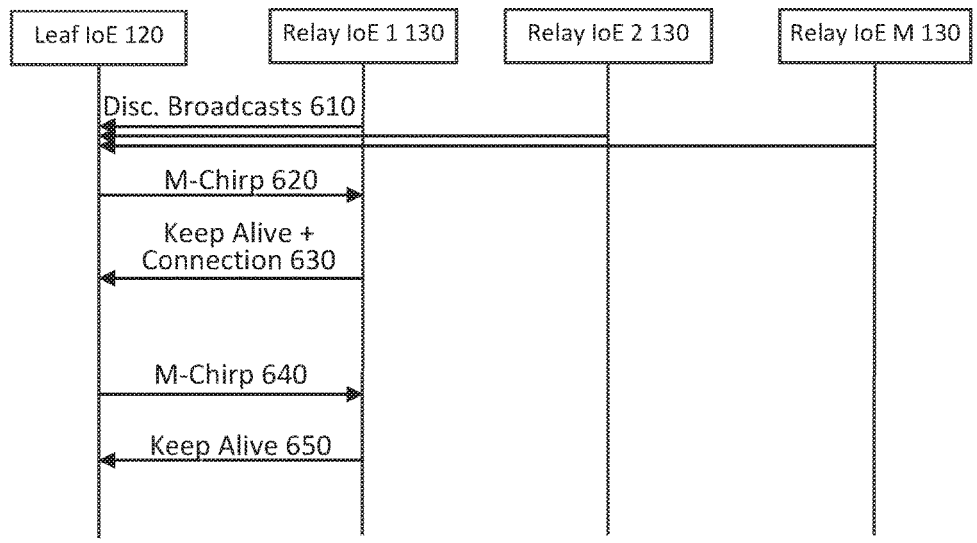
FIG. 6 is a protocol diagram illustrating exemplary signaling aspects between leaf devices and relay devices in accordance with various aspects of the present disclosure.
Figure 7:
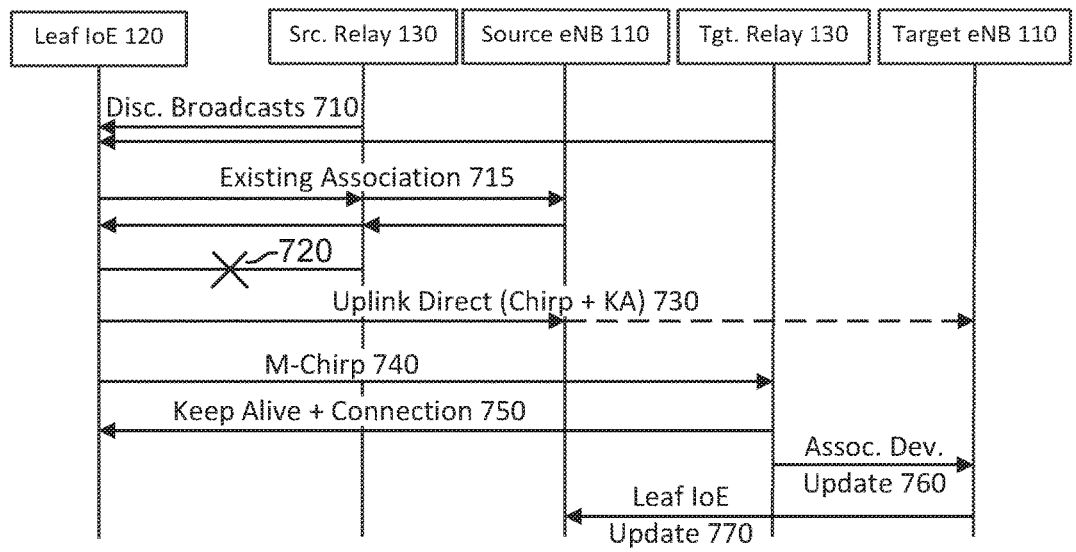
FIG. 7 is a protocol diagram illustrating exemplary signaling aspects between leaf devices and relay devices in accordance with various aspects of the present disclosure.
Figure 8:
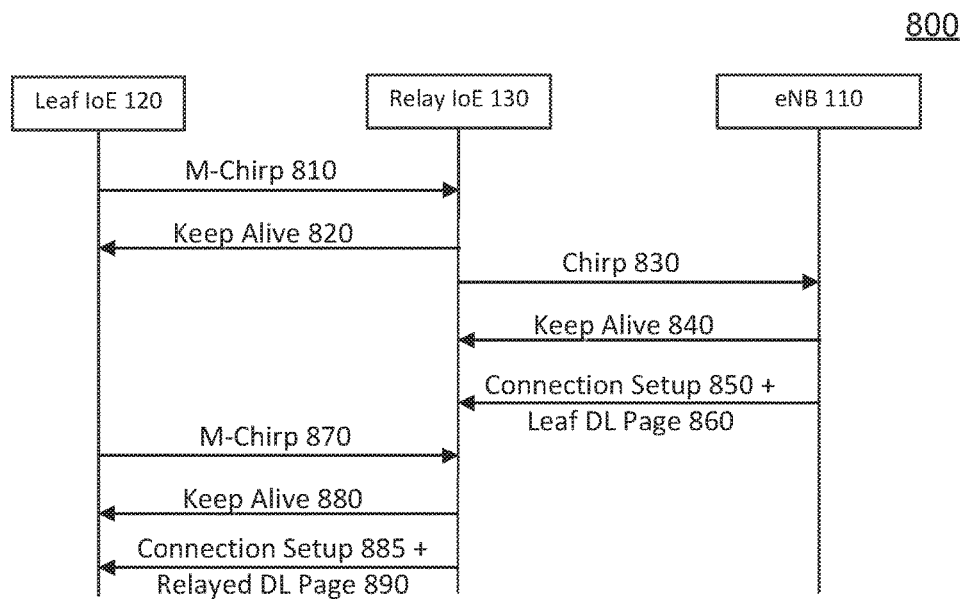
FIG. 8 is a protocol diagram illustrating exemplary signaling aspects between leaf devices and relay devices in accordance with various aspects of the present disclosure.

The M-chirp generator 312 may be configured to generate M-chirp signals such as M-chirp signals of FIGS. 6-8. The M-chirp signal may be designed to be directed to a specific relay IOE device 130, for example by scrambling the M-chirp signal with an identifier of the specific relay IOE device 130 (e.g., an identifier provided by a relay IOE device 130 through a discovery broadcast or in response to a discovery chirp, as described further below). The M-chirp signal may include information that is intended to help a relay IOE device 130 associate with the leaf IOE device 120 in various embodiments. For example, the M-chirp may include an identifier of the leaf IOE device 120, an expected periodicity of uplink traffic from the leaf IOE device 120 to the relay IOE device 130, and any other information that may be useful to let relay IOE device 130 prepare to relay traffic between leaf IOE device 120 and base station 110. In some embodiments, an M-chirp signal may be used to facilitate association of the leaf IOE device 120 to a relay IOE device 130. In other embodiments, an M-chirp signal may be sent from a leaf IOE device 120 to a relay IOE device 130 to maintain the link after association has been completed. Once the M-chirp signal is generated, it may be passed to the modem subsystem 314 for encoding.

The modem subsystem 314 may be configured to modulate and/or encode data according to a modulation and coding scheme (MCS), e.g., a low-density parity check (LDPC) coding scheme, a turbo coding scheme, a convolutional coding scheme, etc.

The transceiver 316 may include a transmitter and a receiver and any other components to allow transmission and reception of data, for example to process (e.g., perform analog to digital conversion or digital to analog conversion, etc.) modulated/encoded data from the modem subsystem 308 (on outbound transmissions) or transmissions originating from another source such as a relay IOE device 130 or a base station 110. For the transmitter, this may include digital to analog conversion, a local oscillator, and upconversion of baseband signals to the selected transmission frequency, to name just a few examples. For the receiver, this may include a down converter to put the received signal at baseband, a baseband filter, and an analog-to-digital converter to name a few examples.

The RF front end 318 may include a filter 322, which may be for example a band-pass filter to filter out-of-band signals. The RF front end 318 may also include an impedance matching circuit and an amplifier 316. Although illustrated as separate, as will be recognized some aspects described above with respect to the transceiver 316 may be performed by the RF front end 318 (e.g., upconversion, downconversion, and mixing) and vice versa. The RF front end 318 may provide the modulated and/or processed data, e.g. data packets, to the antenna 324 for transmission to relay IOE devices 130 or the base station 110.

The antenna 324 may include one or multiple antennas of similar or different designs in order to sustain a single or multiple transmission links, respectively. The antenna 324 of the leaf IOE device 120 may transmit data provided from the transceiver 316 after modulation and coding from the modem subsystem 308 and amplification at the RF front end 318. The antenna 324 of the leaf IOE device 120 may also receive data from multiple sources, including from relay IOE devices 130 and/or a base station 110. The antenna 324 may feed the received data to the RF front end 318. When data received from the antenna 324 is filtered by the filter 322, the received signal is input to the transceiver 316.

Link monitoring module 326 may monitor the data output of transceiver 316 for keep alive signals from an associated relay IOE device 130 (in other words, a relay IOE device 130 with which the leaf IOE device 120 is already associated), such as keep alive signals 560 in FIG. 5A. As will be further described below, keep alive signals indicate that the associated relay IOE device 130 is still within range 150 of leaf IOE device 120, and is therefore still a valid path to base station 110. If keep alive signals are not received after association with a relay IOE device 130, link monitoring module 326 may determine that a link breakage has occurred and initiate re-association with a new target relay IOE device 130, as is further described below with reference to FIG. 7.

Figure 4:
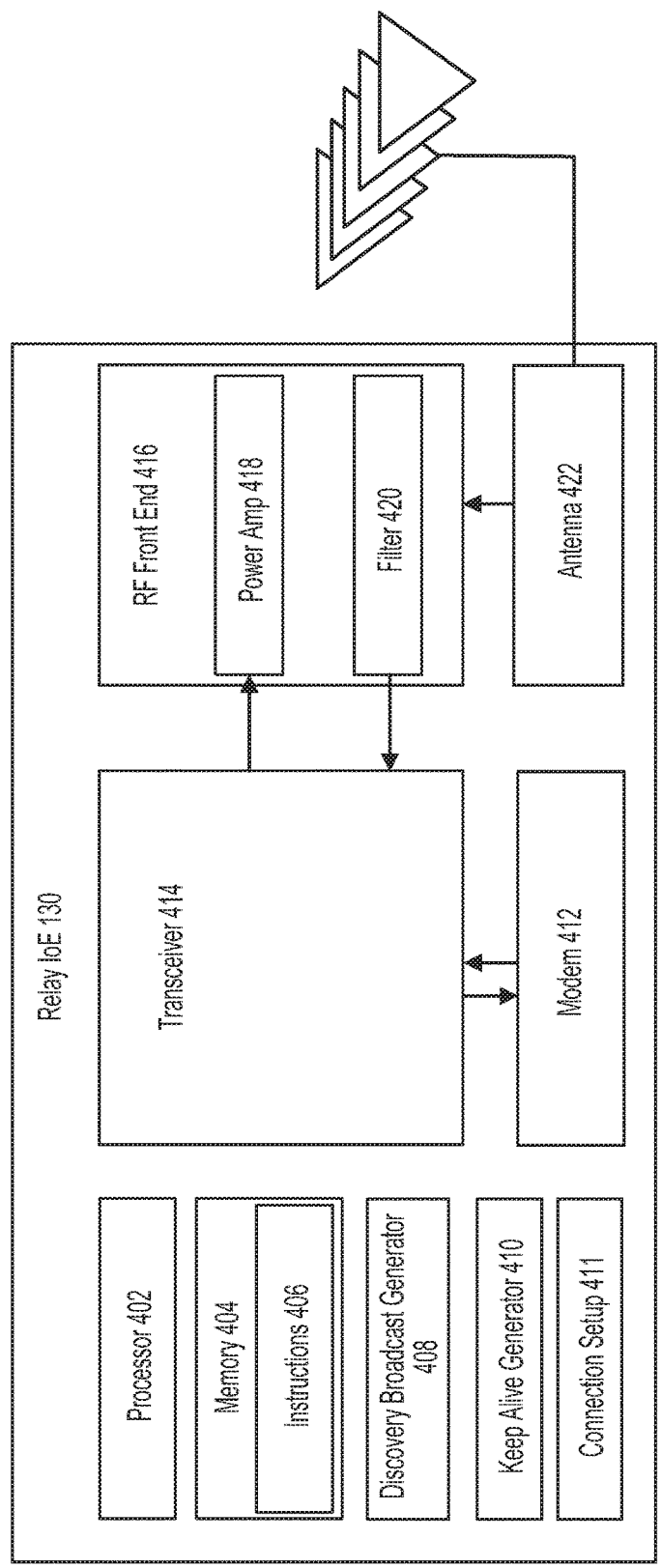
FIG. 4 is an illustration of an exemplary wireless communications device in accordance with various aspects of the present disclosure.

FIG. 4 is a block diagram of an exemplary relay IOE device 130 according to embodiments of the present disclosure. The relay IOE device 130 may include a processor 402, a memory 404, a discovery broadcast generator 408, a keep alive generator 410, a connection setup module 411, a modem 412, a transceiver 414, an RF front end 416, and an antenna 422. These elements may be in direct or indirect communication with each other, for example via one or more buses. As mentioned above with respect to FIG. 1, the leaf IOE device 120 may communicate with relay IOE devices 130 that are within range, as well as base stations 110 that are within range. As relay IOE device 130 and leaf IOE device 120 are very similar, the processor 402, memory 404, instructions 406, modem 412, transceiver 414, RF front end 416, and the antenna 422 may be substantially similar in their description to the processor 302, memory 304, instructions 306, modem 314, transceiver 316, RF front end 318, and the antenna 324, respectively.

The discovery broadcast generator 408 may be configured to generate a discovery broadcast signal, such as discovery broadcast signals 610 and 710 of FIGS. 6 and 7, respectively. In some embodiments, the discovery broadcast signal may be used to inform any potential leaf IOE devices 120 within range that relay IOE device 130 is available. The discovery broadcast signal may include information that a leaf IOE device 120 can use to select a relay IOE device 130 to associate with. This may include, for example, the energy consumption from the relay IOE device 130 to the base station 110, the number of relay IOE devices 130 required to reach base station 110 from this relay IOE device 130, the timing of awake cycles of the relay IOE device 130, an identifier of the relay IOE device 130, or the like. Once the discovery broadcast signal is generated, it may be passed to the modem subsystem 412 for encoding.

Keep alive generator 410 may be configured to generate a keep alive signal. The keep alive signal may perform multiple functions in various embodiments. In an embodiment, the keep alive signal may be used to provide information to a requesting leaf IOE device 120 in response to a discovery chirp, as shown in FIG. 5A. In such embodiments, the keep alive signal functions similarly to the discovery broadcast signal generated by discovery broadcast generator 408, and may contain similar information (such as the energy consumption from the relay IOE device 130 to the base station 110, the number of relay IOE devices 130 required to reach base station 110 from this relay IOE device 130, the timing of awake cycles of the relay IOE device 130, or the like that a leaf IOE device 120 can use to select a relay IOE device 130 to associate with, as well as an identifier of the relay IOE device 130, to name a few examples). In another embodiment, keep alive signals may be transmitted in response to receipt of M-chirp signals from leaf IOE devices 120 as a means of confirming that the relay IOE device 130 is still linked to the leaf IOE device 120. In another embodiment, the keep alive signals may be periodically transmitted to associated leaf IOE devices 120 without any prompting by the leaf IOE devices 120 (e.g., by one or more chirps) in order to confirm that the relay IOE device 130 is still linked to the associated leaf IOE device 120. Once the keep alive signal is generated, it may be passed to the modem subsystem 412 for encoding.

Connection setup module 411 may be configured to generate a connection setup signal for associating with a leaf IOE device 120 or a base station 110. The connection setup signal may contain information about the relay IOE device 130 such as the periodicity with which the relay IOE device 130 expects to receive signals from the leaf IOE device 120 (e.g., to at least confirm that the link is alive and/or provide data for relay), as well as the periodicity with which the relay IOE device 130 expects to send keep alive signals to the leaf IOE device 120 to confirm to the leaf IOE device 120 that the link is alive.

Referring now to FIG. 5A, there is illustrated a signal diagram 500 for an embodiment of associating a leaf IOE device 120 with a relay IOE device 130. There may be a plurality of relay IOE devices 130 within range (e.g., range 150 of FIG. 1) of leaf IOE device 120. In the exemplary embodiment of FIG. 5A, no base station 110 is within range 150 of the leaf IOE device 120, but a base station 110 may be within range of one or more of the relay IOE devices 130. Leaf IOE device 120 broadcasts a discovery chirp signal 510, as described above with reference to FIG. 3 (e.g., generated by the discovery chirp generator 308), which may be received by all relay IOE devices 130 in range of the leaf IOE device 120. The discovery chirp 510 may be broadcast during a common awake period, which may be called a discovery period, of the leaf IOE device 120 and the relay IOE devices 130. In some embodiments, a discovery period is pre-arranged and known to all IOE devices in the mesh network 100. This discovery period may occur relatively infrequently, and each IOE device may have other awake periods between each discovery period.

After receiving the discovery chirp 510, relay IOE devices 130 respond with a keep alive signal 520, as described above with reference to FIG. 5A, containing information that the leaf IOE device 120 may use to select one of the relay IOE devices 130 to associate with. In some embodiments, the relay IOE device 130 may be pre-programmed to respond to the discovery chirp 510 with the keep alive signal 520. In other embodiments, the discovery chirp 510 may request response with the keep alive signal 520.

After receiving the keep alive signals 520, the leaf IOE device 120 may select one of the relay IOE devices 130 to associate with based upon information contained in the keep alive signal, as described above with reference to FIG. 3. The leaf IOE device 120 may then send a relay selection signal 530 to the selected relay IOE device 130. The relay selection signal 530 informs the relay IOE device 130 that the leaf IOE device 120 wishes to associate with it, and may contain information such as the expected periodicity of uplink traffic from the leaf IOE device 120 to the relay IOE device 130.

In response, the relay IOE device 130 sends a connection setup signal 540 that may include information such as an expected periodicity of receiving M-chirp signals, an expected periodicity of keep alive signals, etc. With the connection information, the leaf IOE device 120 and the relay IOE device 130 establish a relay mesh connection and may proceed with communicating data.

In some embodiments, leaf IOE devices 120 and relay IOE devices 130 may transmit and receive information during regularly spaced transmission periods, or frame periods, corresponding to awake periods of the IOE devices. The transmission periods of the leaf IOE device 120 and the selected relay IOE device 130 may overlap. The relay selection signal 530 may, for example, inform the selected relay IOE device 130 that an M-chirp signal 550 will be sent every K transmission periods to the relay IOE device 130 (e.g., K may be one or more transmission periods). The relay IOE device 130 may use this information to confirm that the leaf IOE device 120 is still within range of the relay IOE device 130. Likewise, the leaf IOE device 120 may expect a keep alive signal 560 to be received from the selected relay IOE device 130 every K transmission periods in response to the M-chirp signal in order to confirm that the selected relay IOE device 130 is still within range 150 of the leaf IOE device 120 (and/or that the connection remains unbroken).

A failure to receive the M-chirp signal 550 at the selected relay IOE device 130 or a failure to receive the keep alive signal 560 at the leaf IOE device 120 may indicate a link breakage. In the case of a link breakage, the relay IOE device 130 may simply save signal overhead by ceasing to send keep alive signals 560 and ceasing to monitor for M-chirp signals 550. The leaf IOE device 120, however, may be triggered to search for a new relay IOE device 130 when it detects a link breakage. This is discussed further with respect to FIG. 7 below.

The choice of parameter K may involve a tradeoff between signal overhead and mobility latency, where mobility latency refers to the amount of relative movement that occurs between two devices between consecutive communications. For example, the larger K is (i.e., the longer between instances of M-chirp and keep alive signals), the lower overhead is as less signals are sent, and it may be possible for one or both of the leaf IOE device 120 and the relay IOE device 130 to reduce their number of awake cycles by increasing K. However, if either the leaf IOE device 120 or the selected relay IOE device 130 are mobile, increasing K means increasing the time that a link can be broken before the breakage is detected, triggering the leaf IOE device 120 to find a new relay IOE device 130 before it may resume sending data to base station 110.

Referring now to FIG. 5B, there is illustrated a signal diagram 562 for an embodiment of associating a leaf IOE device 120 with a relay IOE device 130. As demonstrated in FIG. 5B, some signal overhead may be saved by reducing the number of overall transmissions made during the association. Instead of allowing each relay IOE device 130 to send keep alive signals back to the leaf IOE device 120 responsive to a discovery chirp broadcasted, the base station 110 may coordinate the association.

Leaf IOE devices 120 may each broadcast discovery chirps 565, such as discovery chirp 510 discussed with respect to FIG. 5A, within a discovery period, to relay IOE devices 130 within range 150. Each of the relay IOE devices 130 may aggregate the information from received discovery chirps 510 into a respective list of leaf IOE devices 120 that they could potentially serve. Each relay IOE device 130 may then send that information as a potential leaf list signal 570 (e.g., each sending a respective leaf list signal 570) to the respective base stations 110 that the relay IOE devices 130 are in communication with. The receiving base station 110 may use the information contained within the discovery chirps 565 to choose which relay IOE device 130 to associate with each leaf IOE device 120, as described above with reference to the relay selection module 208 of FIG. 2.

After the base station 110 has made selection(s) (e.g., each base station 110 making selections for those relay IOE devices 130 it is serving), it may send a relay selection signal 575 to each selected relay IOE device 130 that is to be associated with a leaf IOE device 120. The relay selection signal 575 informs the relay IOE device 130 which leaf IOE device 120 it is to be associated with.

Responsive to the relay selection signal 575, the selected relay IOE device 130 (here, relay IOE device 2) then sends a keep alive and connection setup signal 580 (combined in one signal or split into multiple) to the leaf IOE device 120 with which it is to associate. The keep alive/connection setup signal 580 may communicate to the leaf IOE device 120 information such as an expected periodicity of receiving M-chirp signals 585 as well as an expected periodicity of transmitting keep alive signals 590.

With the connection information, the leaf IOE device 120 and the relay IOE device 130 establish a relay mesh connection and may proceed with communicating data. As discussed above with respect to FIG. 5A, when either IOE fails to receive the expected signal, a link breakage may be determined, as further discussed below with reference to FIG. 7.

Referring now to FIG. 6, there is illustrated a signal diagram 600 for another embodiment of associating a leaf IOE device 120 with a relay IOE device 130. In this embodiment, a plurality of relay IOE devices 130 may initiate association by periodically broadcasting discovery broadcast signals 610 during a discovery period (in contrast to the discovery chirps described with respect to FIGS. 5A and 5B above). The discovery broadcast signals 610 may contain information useful to leaf IOE devices 120 for selection of a relay IOE device 130, such as the energy consumption from the relay IOE device 130 to the base station 110, the number of additional relay IOE devices 130 required to reach base station 110 from the relay IOE device 130, the timing of awake cycles of the relay IOE device 130, or the like. Leaf IOE devices 120 may receive the discovery broadcast signals 610 and use the information contained therein to select a relay IOE device 130 to associate with, as described above with respect to FIG. 3. Furthermore, the leaf IOE devices 120 may maintain a list of relay IOE devices 130 from which they have received discovery broadcasts 610 (currently and/or in the past), along with any information contained in the discovery broadcasts 610, such as the awake periods of the corresponding relay IOE devices 130.

After the leaf IOE device 120 has selected a relay IOE device 130 for association, the association may be initiated by sending an M-chirp signal 620, which may include information such as an identifier for the leaf IOE device 120 as well as an expected periodicity of uplink traffic. In an embodiment, the M-chirp signal 620 may function similarly to the relay selection signals of other embodiments, informing the relay IOE device 130 that association is desired by the leaf IOE device 120. In response to receiving the M-chirp signal 620, the selected relay IOE device 130 sends a combination keep alive and connection setup signal 630 to the leaf IOE device 120 to complete the association. The keep alive and connection setup signals may alternatively be separate signals sent in sequence.

After association has been completed, the leaf IOE device 120 is expected to send an M-chirp signal 640 once every K transmission periods, or frame periods, to keep the link alive (in addition to any data packets that may be transmitted during a given transmission period, which refers to periods in which the devices are awake instead of in sleep mode). The M-chirp signal 640 may be similar to M-chirp signal 620, except that it may not include an expected periodicity of uplink traffic. Likewise, the relay IOE device 130 may respond to the M-chirp with a keep alive signal 650 to keep the link alive. As described above, the choice of K may involve a tradeoff between signal overhead and mobility latency. If a link breakage is detected/determined, the relay IOE device 130 may stop using resources to maintain the link, while the leaf IOE device 120 may search for a new relay IOE device 130 to associate with, as described below with respect to FIG. 7.

Turning now to FIG. 7, there is illustrated a signal diagram 700 for an embodiment of associating a leaf IOE device 120 with a new relay IOE device 130 after a link breakage has been detected and determined by the leaf IOE device 120. As shown, discovery broadcasts 710 sent by relay IOE devices 130 may be received by leaf IOE devices 120 (e.g., as described above with respect to FIG. 6) to establish an initial association. In other embodiments (e.g., as described with respect to FIGS. 5A and/or 5B), discovery chirps may be sent by leaf IOE devices 120 (instead of discovery broadcasts from relay IOE devices 130) and keep alive signals may be sent by relay IOE devices 130 to establish the initial association. As illustrated in FIG. 7, the associated relay IOE device 130 is referred to as the source relay IOE device 130 and the base station 110 to which the source relay IOE device 130 connects is referred to as the source eNB 110. Existing association 715 may include the normal behavior of an associated leaf IOE device 120 and relay IOE device 130 as described above, for example transmission of traffic (uplink and/or downlink) as well as the period transmission and receipt of M-chirp and keep alive signals.

When a link breakage 720 occurs, it may be detected at leaf IOE device 120 as a failure to receive an expected keep alive signal, as described above. The leaf IOE device 120 may begin to search for a new target relay IOE device 130 to associate with. If possible, the leaf IOE device 120 may directly uplink to the source base station 110 using uplink direct signaling 730, which may include a series of chirps sent by the leaf IOE device 120 to source base station 110 and keep alive signals sent by source base station 110 to leaf IOE device 120. This may be less efficient than connecting to a relay IOE device 130 even when a base station 110 is in range if the base station 110 far away from the leaf IOE device 120. In this case, the power level required to communicate with the base station 110 may be unacceptably high, and therefore direct uplink may be a contingency for periods when no relay IOE devices 130 are available.

The leaf IOE device 120 may consult the a list of known relay IOE devices 130 it maintains locally, for example in memory 304 in FIG. 3, such as the list established above with respect to FIG. 6, in order to select a new target relay IOE device 130. If none of the relay IOE devices 130 stored in the list are available options, for example if leaf IOE device 120 or relay IOE devices 130 have moved out of range 150, the leaf IOE device 120 may wait to receive discovery broadcasts 710, or may send out discovery chirps as in FIGS. 5A/5B. Once a target relay IOE device 130 is located, leaf IOE device 120 may send M-chirp 740 to the target relay IOE device 130 and target relay IOE device 130 may respond with a combination keep alive and connection setup signal 750, such as described above with respect to FIG. 6. Alternatively, the association processes described above with respect to FIGS. 5A/5B may be used.

After association between leaf IOE device 120 and target relay IOE device 130 is completed, the target relay IOE device 130 may communicate to a target eNB 110 to which it is connected that it has a new associated device (and include, for example, an identifier of that associated leaf IOE device 120). The target eNB 110 may in turn communicate to the source eNB 110 that leaf IOE device 120 has changed association from source relay IOE device 130 to target relay IOE device 130. For example, base stations 110 may be connected via a core backbone (e.g., an X2 interface), the internet, or the like that allows them to share information despite not having overlapping wireless communication ranges (or, in some embodiments where there is overlap, via an over-the-air interface).

Referring now to FIG. 8, there is illustrated a signal diagram 800 for an embodiment of downlink paging from a base station 110 to a leaf IOE device 120 via a relay IOE device 130. After a leaf IOE device 120 and a relay IOE device 130 are associated by any one of the methods described above with respect to FIG. 5A, 5B, 6, or 7, during the course of normal communications M-chirp signals 810 and keep alive signals 820 will be exchanged to keep the link alive. In a similar manner, the relay IOE device 130 may send chirp signals 830 to the base station 110, and the base station 110 may respond with keep alive signals 840 in order to confirm a valid link. In some embodiments, the rate of exchange of M-chirp signals 810 and keep alive signals 820 between leaf IOE device 120 and relay IOE device 130 may differ from the rate that chirp signals 830 and keep alive signals 840 are exchanged between relay IOE device 130 and base station 110.

During the course of this operation, the eNB 110 may receive data for the leaf IOE device 120 (e.g., via an external source such as via a packet network). In order to notify leaf IOE device 120 that it should stay awake to receive data, the eNB 110 may page the leaf IOE device 120. To do so, according to embodiments of the present disclosure, a connection setup signal 850 and leaf downlink page signal 860 may be sent from the eNB 110 to the relay IOE device 130, for example after completing a chirp-keep alive exchange. These signals may then be relayed from the relay IOE device 130 to the leaf IOE device 120 after the completion of the next M-chirp-keep alive exchange between the leaf IOE device 120 and the relay IOE device 130.

The frequency of M-chirps 810 and chirps 830 may in some embodiments be chosen according to a paging latency constraint in the mesh network 100. As used herein, a paging latency constraint may refer to a limit on the maximum amount of time allowed for a leaf IOE device 120 to receive a downlink page from the eNB 110. Given a paging latency constraint of N transmission periods, both M-chirps 810 occur at least every K transmission periods and chirps 830 occur every L transmission periods, where K and L are each less than N, in order to ensure that downlink page signals 860 reach the leaf IOE device 120 within the paging latency constraint window. Furthermore, K and L may take into account the number of relay IOE devices 130 between the eNB 110 and the leaf IOE device 120 in order to satisfy end to end latency requirements (e.g., the maximum amount of time the system is allowed to take to transmit a signal from a leaf IOE device 120 to the eNB 110). However, K and L may be different, as described above. For example, when the leaf IOE device 120 is relatively static or slowly moving, K may be greater than L (i.e., the relay IOE device 130 sends chirps 830 more frequently than the leaf IOE device 120 sends M-chirps 810) to reduce energy consumption at the leaf IOE device 120. In another example, when the leaf IOE device 120 is moving quickly relative to the relay IOE device 130, K may be less than L (i.e., the leaf IOE device 120 sends M-chirps 810 more frequently than the relay IOE device 130 sends chirps 830) because the leaf IOE device 120 is checking its link status with the relay IOE device 130 more frequently.

In some embodiments, to further reduce overhead, relay IOE devices 130 may send keep alive signals 820 more frequently than leaf IOE devices 120 send M-chirp signals 810 (e.g., a relay IOE device 130 may send more than one keep alive signal 820 per M-chirp 810 sent by a leaf IOE device 120). In this case, the relay IOE device 130 may erroneously miss a link breakage for some period of time after the leaf IOE device 120 has identified the breakage, but identification of the link breakage is less critical for the relay IOE device 130 so this is acceptable.

Figure 9:
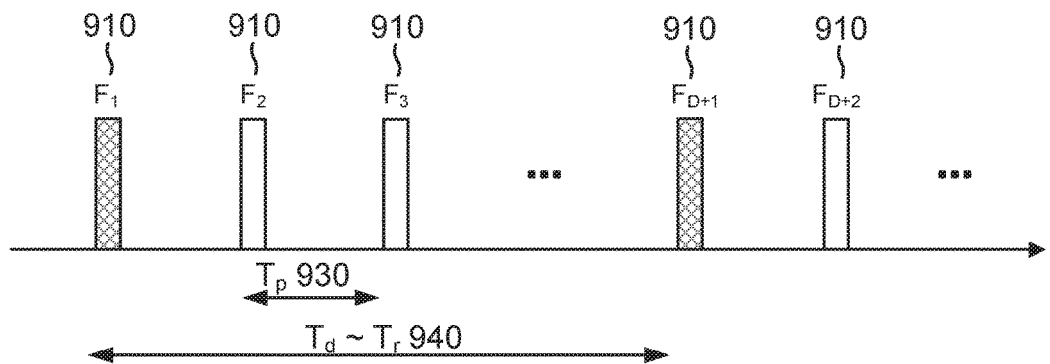
FIG. 9 illustrates a timing diagram of transmissions made by a wireless communications device in accordance with various aspects of the present disclosure.

Referring now to FIG. 9, there is illustrated a timing diagram 900 of transmissions made by a low mobility IOE, for example a leaf IOE device 120. This may also be referred to herein as a slow mobility regime. A plurality of periodic transmission periods 910 are shown. The periodic transmission periods 910 may each correspond to awake periods of the leaf IOE device 120, and the awake periods may be spaced some amount of time apart, where the spacing is chosen to save power by allowing the leaf IOE device 120 to sleep in a low power state in the interim while also ensuring that data is sent and received by leaf IOE device 120. Uplink traffic is sent from the leaf IOE device 120 to the relay IOE device 130 at a packet periodicity (Tp) 930. In an embodiment (low mobility), the mobility of the leaf IOE device 120 is slow enough that the relay change time (Tr) is greater than the packet periodicity Tp 930 (meaning that the time to change relays is longer than the time to transmit multiple packets). In some embodiments, a discovery periodicity (Td) 940 may be approximately the same as the relay change periodicity, while in other embodiments they are different (e.g., Td may be greater than Tr or vice versa). For example, transmission periods 910 labeled $F_1$ and $F_{D+1}$ may be discovery periods (e.g., where available relay IOE devices 130 may transmit discovery broadcasts whether or not those are used to trigger association according to embodiments of the present disclosure). As shown, the discovery periods $F_1$ and $F_{D+1}$ may be spaced apart some amount of time D, where D is chosen to save power of the relay IOE device 130 while also ensuring that the relay IOE device 130 is discoverable by leaf IOE devices 120. In a given discovery period, the leaf IOE device 120 may have moved out of range of an associated relay IOE device 130 and into range of a new set of relay IOE devices 130.

Accordingly, transmissions made during transmission periods 910 labeled $F_1$ and $F_2$ are sent via an associated relay IOE device 130 (e.g., a source relay IOE device 130 of FIG. 7) to a base station 110 (e.g., a source eNB 110). Thus, multiple periodic packets may be transmitted before a change in relay IOE device 130 occurs. At some point before another discovery period occurs, the leaf IOE device 120 may move outside the range of the source relay IOE device 130. As a result, the leaf IOE may use a new discovery period to locate a target relay IOE device 130 with which to associate. After associating with a target relay IOE device 130 at some point prior to $F_{D+2}$, the leaf IOE device 120 may make transmissions during transmission period 910 labeled $F_{D+2}$ via the different, target relay IOE device 130 (e.g., a target relay IOE device 130 of FIG. 7) to the eNB 110 serving the target relay IOE device 130 (which may be a different base station 110 or the same base station 110 that was serving the source relay IOE device 130). In slow mobility embodiments, use of the discovery broadcast method of FIG. 6 may better reduce overhead in the mesh network 100 since the slow movement of leaf IOE device 120 reduces the harm of the increased mobility latency.

Figure 10:
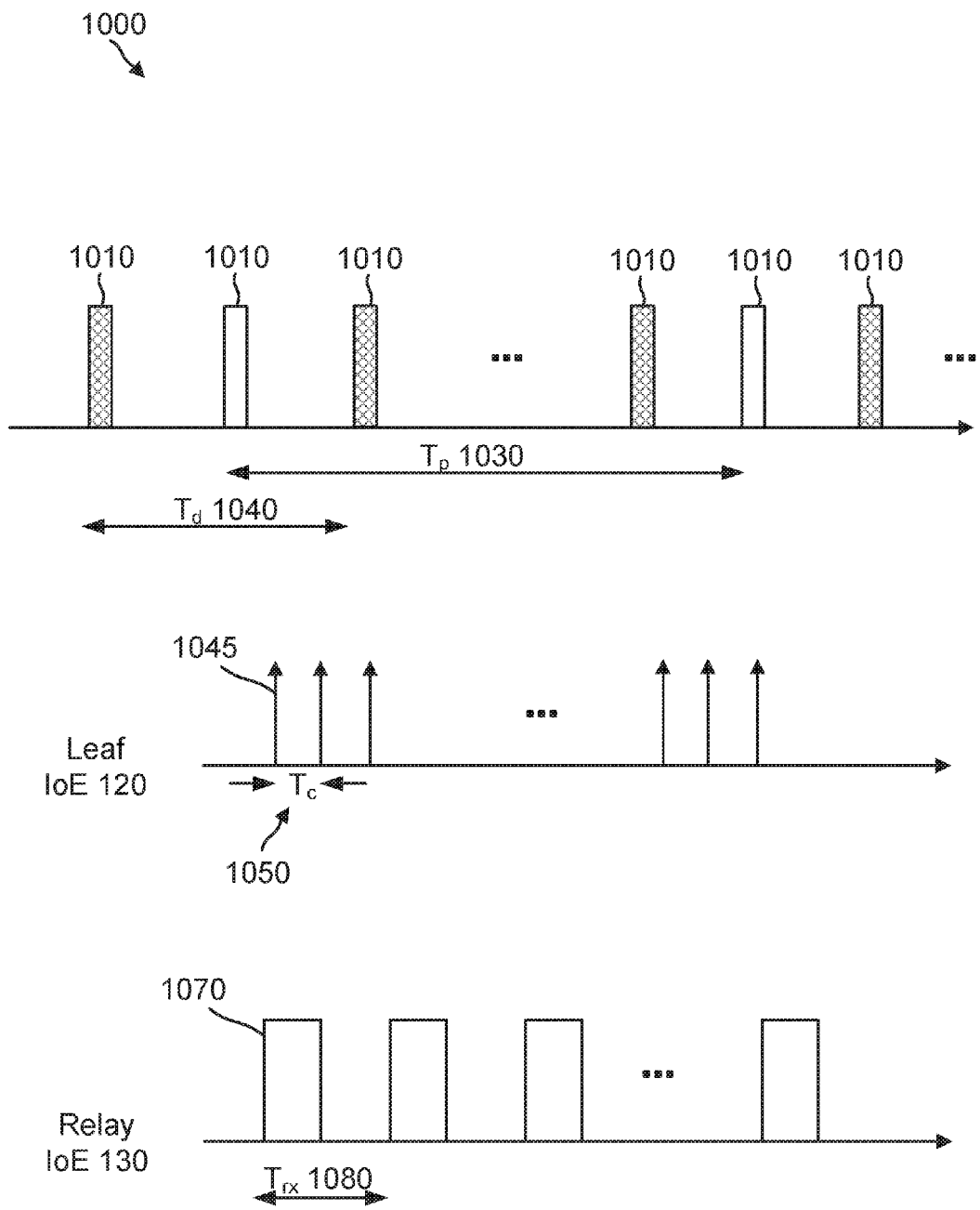
FIG. 10 illustrates a timing diagram of transmissions made by a wireless communications device in accordance with various aspects of the present disclosure.

Referring now to FIG. 10, there is illustrated a timing diagram 1000 for transmissions made by a high mobility IOE, for example a leaf IOE device 120. A plurality of periodic transmission periods 1010 are shown. The periodic transmission periods 1010 may correspond to awake periods of the leaf IOE device 120, and the awake periods may be spaced some amount of time apart, where the spacing is chosen to save power by allowing the leaf IOE device 120 to sleep in a low power state in the interim while also ensuring that data is sent and received by leaf IOE device 120. In an embodiment (high mobility), the mobility of the leaf IOE device 120 is fast enough that the relay change time (Tr) is less than the packet periodicity Tp 930 (meaning that the time to change relays is shorter than the time to transmit/receive multiple packets). Traffic is sent, such as from the leaf IOE device 120 to the relay IOE device 130, at a packet periodicity (Tp) 1030. In this embodiment, the leaf IOE device 120 is moving quickly enough that the relay change time (Tr) is less than the packet periodicity Tp 1030.

In such embodiments, use of a discovery chirp system by the leaf IOE device 120 may be optimal given the likelihood that the leaf IOE device 120 will be searching for a new relay IOE device 130 every time it has uplink traffic to transmit. For example, when a leaf IOE device 120 has uplink traffic ready to transmit in a transmission period 1010 labeled $F_2$, it may send a discovery chirp 1045 (e.g., a discovery chirp 510) at a chirp periodicity (Tc) 1050. The discovery chirp 1045 may be repeated multiple times within a discovery period (Td) 1040.

Meanwhile, relay IOE devices 130 may have a receipt period 1070 (where the relay IOE device 130 wakes up from a sleep state) that occurs with a receipt periodicity (Trx) 1080, where the length of receipt period 1070 is greater than Tc 1050 so that, if a receipt period 1070 occurs during Td 1040, then the discovery chirp 1045 will be received by the relay IOE device 130. Furthermore, Trx 1080 may be calibrated such that any Td 1040 may overlap with a Trx 1080, thus providing that at least one discovery chirp 1045 will overlap with a receipt period 1070.

In this embodiment, the relay IOE device 130 reduces signal overhead by not transmitting discovery broadcasts frequently, and the leaf IOE device 120 reduces signal overhead by limiting transmission to when it has uplink traffic to transmit. However, the relay IOE device 130 may have more frequent awake periods in order to detect the discovery chirps 1045 during receipt periods 1070.

Figure 11:
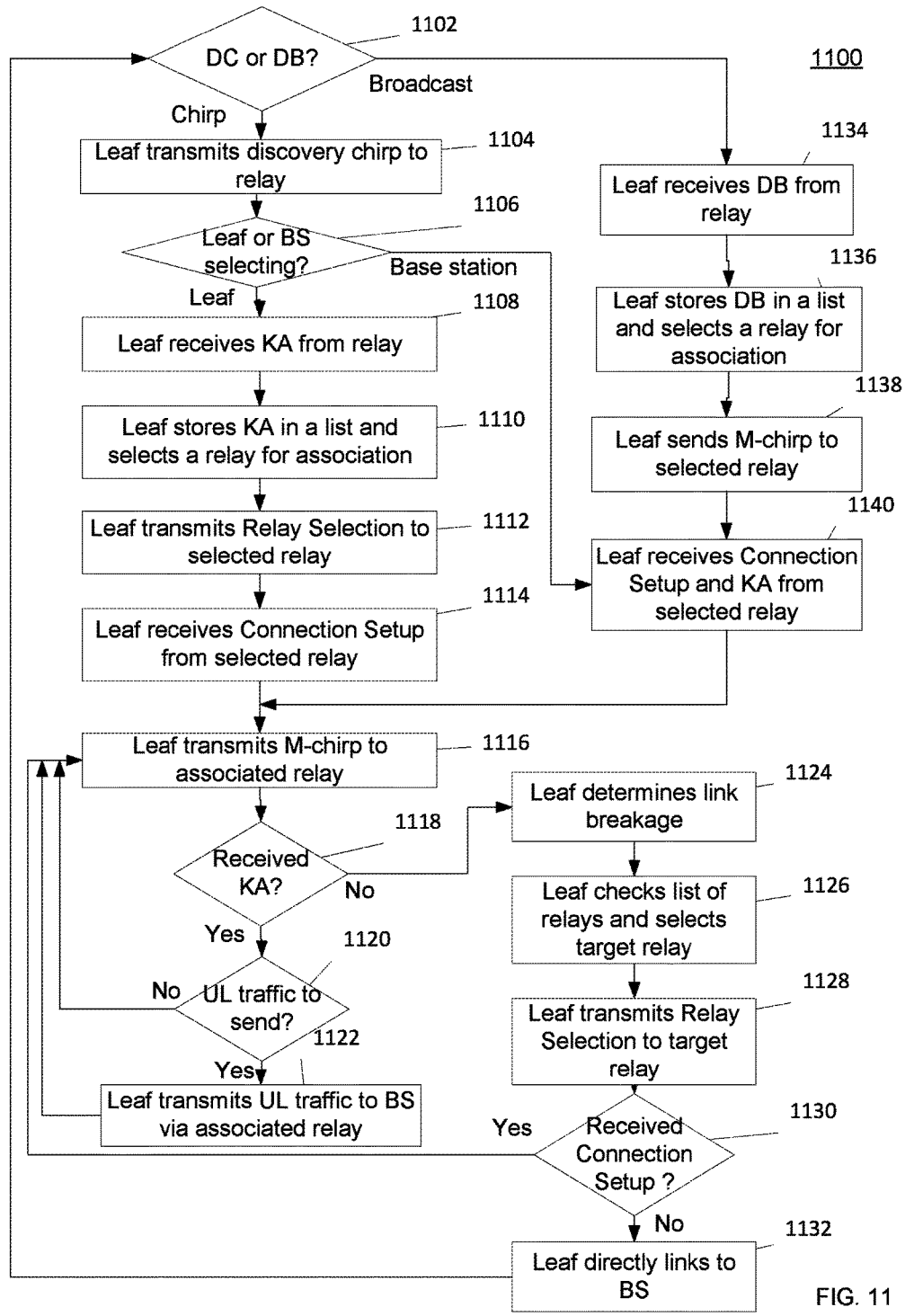
FIG. 11 illustrates a method for wireless communication in accordance with various aspects of the present disclosure.

Referring now to FIG. 11, there is illustrated a block diagram of a method 1100 for associating a leaf IOE device 120 with a relay IOE device 130 that has a path to a base station 110. For ease of illustration, reference will be made to the example using a given leaf IOE device 120, a given relay IOE device 130, and a given base station 110. It is understood that additional steps can be provided before, during, and after the steps of method 1100, and that some of the steps described can be replaced or eliminated from the method 1100. It is also understood that the leaf IOE device 120 may communicate with the relay IOE device 130 either directly or indirectly, such as via one or more other relay IOE devices 130.

At decision block 1102, if the leaf IOE device 120 uses discovery chirps to initiate association with a relay IOE device 130, then the method 1100 proceeds to block 1104. If the leaf IOE device 120 relies on discovery broadcast signals to initiate association with a relay IOE device 130, the method 1100 instead moves to block 1134.

At block 1104, a leaf IOE device 120 sends (e.g., broadcasts) a discovery chirp signal during a first wake up period to one or more relay IOE devices 130 in a mesh network (e.g., that have broadcast their ability to provide a path to a base station 110, such as in one or more prior discovery periods).

At decision block 1106, in embodiments where relay selection is performed by the leaf IOE device 120, the method 1100 moves to block 1108. In embodiments where the base station 110 performs relay selection, the method 1100 moves to block 1140.

At block 1108, the leaf IOE device 120 receives one or more keep alive signals from one or more relay IOE devices 130 (that received the broadcast discovery chirp signal) during a wake up period (e.g., the first wake up period) in response to the chirp signal.

At block 1110, the leaf IOE device 120 stores information contained in the keep alive signals in a list and selects one of the one or more relay IOE devices 130 to associate with based on the information contained in the keep alive signals, for example as described above with respect to FIG. 3.

At block 1112, the leaf IOE device 120 sends a relay selection signal to the selected relay IOE device 130 during a wake up period (e.g., the first wake up period).

Moving to block 1114, the leaf IOE device 120 receives a connection setup signal from the relay IOE device 130 during a wake up period (e.g., the first wake up period) that is suitable to complete association of the leaf IOE device 120 with the relay IOE device 130.

Returning to decision block 1102, if the relay IOE device 120 relies on discovery broadcast signals to initiate association with a relay IOE device 130, the method 1100 moves to block 1134.

At block 1134, during a first wake up period, the leaf IOE device 120 receives discovery broadcast signals from one or more relay IOE devices 130 that are within broadcast range of the leaf IOE device 120. The discovery broadcast signals may be received all during the same, current wake-up period, all in a prior wake-up period, or some combination of the two.

At block 1136, the leaf IOE device 120 stores information contained in the discovery broadcast signals in a list. The leaf IOE device 120 uses the information stored in this list (whether stored previously or in the current wake up period) to select one of the one or more relay IOE devices 130 to associate with based on the information contained in the discovery broadcast signals, for example as described above with respect to FIG. 3.

At block 1138, during a wake up period (e.g., the first wake up period) the leaf IOE device 120 sends an M-chirp signal to the relay IOE device 130 selected at block 1136.

At block 1140, the leaf IOE device 120 receives a connection setup signal and a keep alive signal from the selected relay IOE 130 during a wake up period (e.g., the first wake up period) that is used to complete association of the leaf IOE device 120 with the relay IOE device 130. As noted above, if the base station 110 performs relay selection, the method 1100 proceeds to block 1140 as well. The method 1100 then moves to block 1116.

Moving to block 1116 from either block 1114 or 1140, during a second wake up period the leaf IOE device 120 sends an M-chirp signal to the associated relay IOE device 130 to confirm (or, rather, that is used to confirm) that the link to the associated relay IOE device 130 is still active.

Moving to decision block 1118, during a wake up period (e.g., the second wake up period or another period subsequent to that) the leaf IOE device 120 monitors for a keep alive signal from the relay IOE device 130.

If the keep alive signal is received, the method 1100 proceeds to decision block 1120, where the leaf IOE device 120 checks for uplink traffic to be sent to the base station 110. If no uplink traffic is found, the method returns from decision block 1120 to block 1116 and proceeds as discussed above and below.

If instead at decision block 1120 uplink traffic is found, the method 1100 proceeds to block 1122.

At block 1122, the leaf IOE device 120 transmits the uplink data to the relay IOE device 130 during a common wake up period (e.g., the same wake up period or a different one). The method then returns to block 1116 to proceed as discussed above and further below.

Returning to decision block 1118, if a keep alive signal is not received from the relay IOE device 130, the method 1100 proceeds to block 1124.

At block 1124, the leaf IOE device 120 determines that a link breakage has occurred, for example based on the fact that a keep alive signal was not received.

After determining a link breakage has occurred, at block 1126 the leaf IOE device 120 consults its list of relay IOE devices 130 (e.g., maintained based on discovery broadcasts and/or keep alive signals received) and selects one as a target relay IOE device 130.

At block 1128, the leaf IOE device 120 sends a relay selection signal to the target relay IOE device 130 identified at block 1126.

At decision block 1130, if no keep alive or connection setup signal is received from the target IOE device 130, then the leaf IOE device 120 determines that the target IOE device 130 is unavailable.

In that case, the method 1100 proceeds to block 1132, where the leaf IOE device 120 sends a direct uplink signal to the source base station 110 (e.g., that it was connected to via the now-missing relay IOE device 130, or alternatively to a different base station 110 of which the leaf IOE device 120 has knowledge). If the direct uplink attempt is successful, then the leaf IOE device 120 may continue transmitting and/or receiving data with the base station 110 while searching for a new target relay IOE device 130 (e.g., since a direct uplink connection may drain battery at the leaf IOE device 120 more quickly than is desired/planned).

The method 1100 then returns to block 1102 and proceeds as described above and below (e.g., starting with the leaf IOE device 120 sending out discovery chirps to locate relay IOE devices 130 to connect with, or starting with the leaf IOE device 120 receiving discovery broadcasts from relay IOE devices 130, depending upon the embodiment).

Returning to decision block 1130, if the leaf IOE device 120 receives a keep alive and/or a connection setup from the target relay IOE device 130, the two may establish an association and the method 1100 may return to block 1116 as laid out above.

Figure 12:
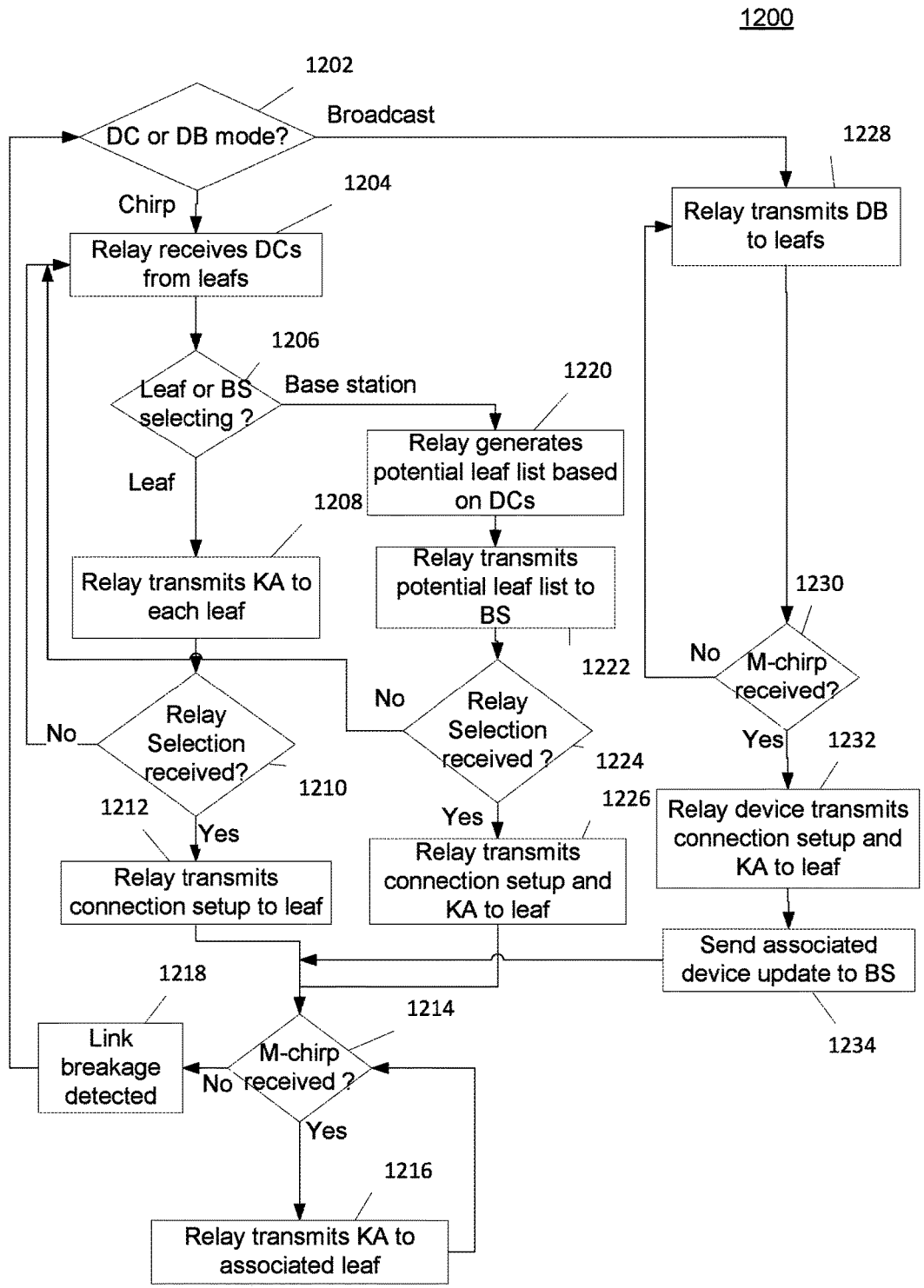
FIG. 12 illustrates a method for wireless communication in accordance with various aspects of the present disclosure.

Referring now to FIG. 12, there is illustrated a block diagram of a method 1200 for associating a relay IOE device 130 that has a path to a base station 110 with a leaf IOE device 120. For ease of illustration, reference will be made to the example using a given relay IOE device 130, a given leaf IOE device 120, and a given base station 110. It is understood that additional steps can be provided before, during, and after the steps of method 1200, and that some of the steps described can be replaced or eliminated from the method 1200. It is also understood that the relay IOE device 130 may communicate directly or indirectly with the leaf IOE device 120, for example via one or more other relay IOE devices 130.

At decision block 1202, if the relay IOE device 130 receives discovery chirps to initiate association with a leaf IOE device 120, the method 1200 proceeds to block 1204. If the relay IOE device instead transmits discovery broadcast signals to initiate association with a leaf IOE device 120, the method 1200 moves to block 1228.

At block 1204, the relay IOE device 130 having a path to a base station 110 receives one or more discovery chirps from one or more corresponding leaf IOE devices 120.

At decision block 1206, if the leaf IOE device 120 performs relay selection then method 1200 moves to block 1208. If, instead, the base station 110 performs relay selection, then the method 1200 moves to block 1220.

In the embodiments where the leaf IOE device 120 makes the selection, at block 1208 the relay IOE device 130 transmits keep alive signals to each leaf IOE device 120 in response to the respective discovery chirps.

Moving to decision block 1210 from block 1208, the relay IOE device 130 monitors for receipt of a Relay Selection signal from a leaf IOE device 120 indicating that the leaf IOE device 120 has selected the relay IOE device 130 for association. If no relay selection signal is received, the method returns to block 1204 and proceeds as described above and below.

If, instead, the relay IOE device 130 does receive a relay selection signal, the method 1200 proceeds to block 1212.

At block 1212, the relay IOE device 130 transmits a connection setup signal to the associated leaf IOE device 120 to complete association with the leaf IOE device 120, for example as described with respect to at least FIGS. 4-6.

At decision block 1214, the relay IOE device 130 monitors for an M-chirp from the associated leaf IOE device 120 to confirm that the link is still alive. If the relay IOE device 130 receives an m-chirp signal, the method 1200 moves to block 1216.

At block 1216, the relay IOE device 130 transmits a keep alive signal to the associated leaf IOE device 120 in response to the m-chirp signal to indicate that the link is still alive. The method 1200 then returns to decision block 1214 and continues to loop (including relaying associated leaf IOE device 120 data where provided) until a link breakage is detected.

Returning to decision block 1214, if no m-chirp signal is received from the associated leaf IOE device 120, the method 1200 moves to block 1218, where the relay determines that a link breakage has occurred. The method 1200 then returns to block 1202 and proceeds as described above and below (e.g., starting with the relay IOE device 130 receiving discovery chirps or transmitting discovery broadcast signals, depending upon the embodiment).

Returning again to decision block 1206, if the base station 110 performs relay selection (instead of the leaf IOE devices 120, for example), the method 1200 moves to block 1220.

At block 1220, the relay IOE device 130 generates a list of potential leaf IOE devices 120 that it could associate with based on the received discovery chirps broadcasted from leaf IOE devices 120 of block 1204.

At block 1222, the relay IOE device 130 sends the potential leaf list to its serving base station 110 so that the base station 110 may determine what leaf IOE devices 120 the relay IOE device 130 will serve as a relay for (there may be multiple relay IOE devices 130 doing so at the same or different times, depending upon wake-up periods and association requests for example).

At decision block 1224, the relay IOE device 130 monitors for a relay selection signal from the base station 110 in response to the potential leaf list provided to the base station 110 at block 1222. If no relay selection signal is received, the method 1200 returns to block 1204 and proceeds as described above and below (e.g., it listens for more discovery chirp signals from relay IOE devices 120). If the relay receives a relay selection signal from the base station 110, the method 1200 moves to block 1226.

At block 1226, the selected relay IOE device 130 transmits a connection setup signal and/or a keep alive signal to the appropriate leaf IOE device 120 to complete association between the leaf IOE device 120 and the selected relay IOE device 130.

The method 1200 then moves to decision block 1214 and proceeds as described above (e.g., the relay IOE device 130 monitors for M-chirp signals from the associated leaf IOE device 120).

Returning now to decision block 1202, if the relay IOE device 130 transmits discovery broadcast signals to initiate association with a leaf IOE device 120, the method 1200 moves to block 1228.

At block 1228, the relay IOE device 130 transmits a discovery broadcast signal to one or more leaf IOE devices 120 that are within broadcast range (e.g., as described above with respect to FIG. 6 or 7).

At decision block 1230, the relay IOE device 130 monitors for receipt of an M-chirp signal from a leaf IOE device 120 in response to the discovery broadcast sent at block 1228. If no M-chirp signal is received, the method returns to block 1228 (e.g., the relay IOE device 130 sends another broadcast signal, whether in the same wake up period or a different one). If an M-chirp signal is received from a leaf IOE device 120, the method 1200 moves to block 1232.

At block 1232, the relay IOE device 130 transmits a connection setup signal and a keep alive signal to the leaf IOE device 120 to complete association with the leaf IOE device 120 (e.g., includes information used by the leaf IOE device 130 to complete connection setup with the relay IOE device 130).

At block 1234, the relay IOE device 130 sends an associated device update signal to its serving base station 110 to inform the base station 110 of the association with leaf IOE device 120.

The method 1200 then moves to decision block 1214 and proceeds as described above (e.g., the relay IOE device 130 monitors for M-chirp signals from the associated leaf IOE device 120).

Figure 13:
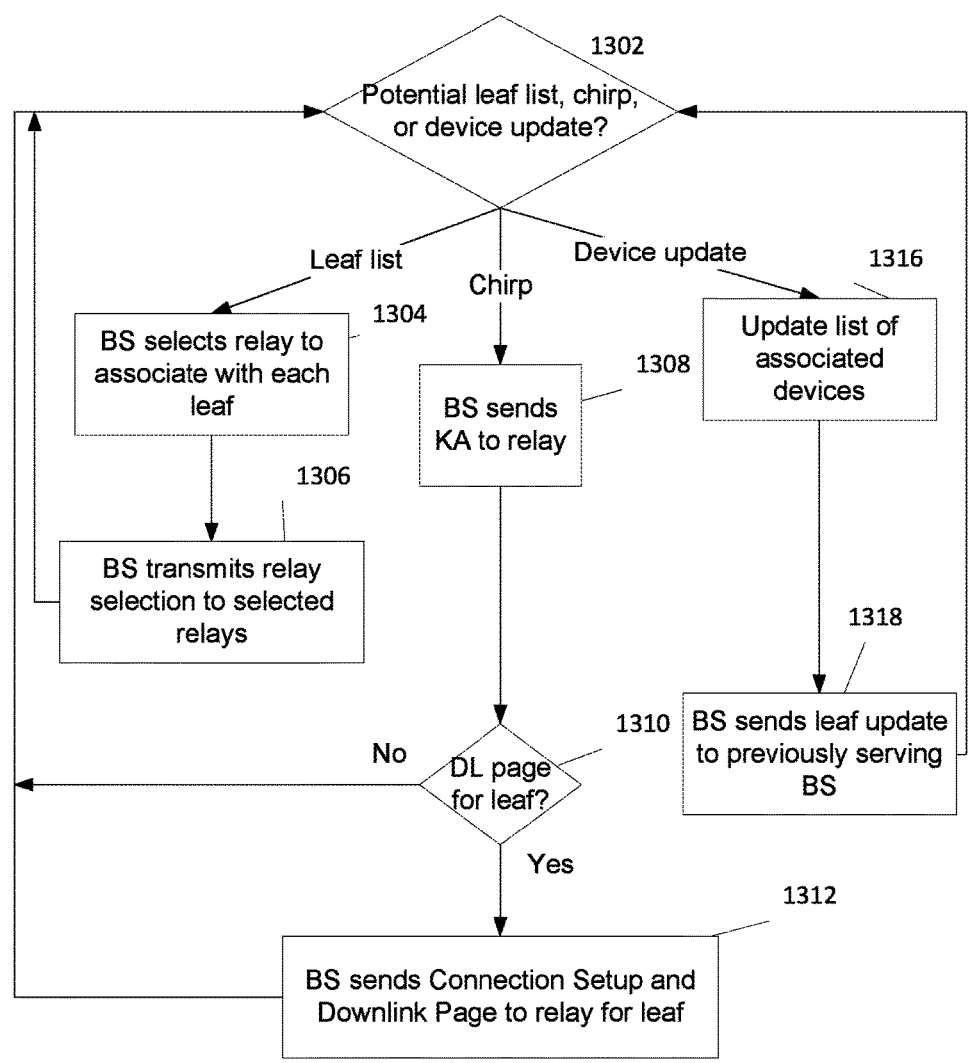
FIG. 13 illustrates a method for wireless communication in accordance with various aspects of the present disclosure.

Referring now to FIG. 13, there is illustrated a block diagram of a method 1300 for pairing selected relay IOE devices 130 with leaf IOE devices 120 at a base station 110, handling downlink paging from the base station 110 to leaf IOE devices 120, and updating records of associations between leaf IOE devices 120 and relay IOE devices 130 after link breakage. For ease of illustration, reference will be made to the example using a given base station 110, a given leaf IOE device 120, and a given relay IOE device 130. It is understood that additional steps can be provided before, during, and after the steps of method 1300, and that some of the steps described can be replaced or eliminated from the method 1300. It is also understood that the base station 110 may communicate directly or indirectly with the given leaf IOE device 120 and the given relay IOE device 130, for example via one or more other relay IOE devices 130.

At block 1302, the base station 110 monitors for receipt of either a potential leaf list, a chirp, or an associated devices update signal from one or more relay IOE devices 130. If a potential leaf list is received, the method moves to block 1304. If a chirp signal is received, the method moves to block 1308. If an associated devices update is received, the method moves to block 1316. Each will be addressed in turn below.

At block 1304 (receipt of a potential leaf list from a relay IOE device 130), the base station 110 selects a relay IOE device 130 for each requesting leaf IOE device 120 based on the received potential leaf lists, which include a list of leaf IOE devices 120 that the transmitting relay IOE device 130 can potentially associate with (those that are seeking association with relay IOE devices 130). The selection may be based on criteria such as those discussed above with respect to FIG. 2.

At block 1306, the base station 110 sends a relay selection signal, indicating that a particular leaf IOE device 120 has been chosen to associate with a particular relay IOE device 130, to each relay IOE device 130 for which a selection has been made.

The method 1200 then returns to block 1302 and continues as described above and below (e.g., the base station 110 monitors for a potential leaf list, a chirp, or an associated devices update signal).

Returning to block 1302, if a chirp signal is received from a relay IOE 130, the method moves to block 1308.

At block 1308, the base station 110 sends a keep alive signal to the relay IOE device 130 that transmitted the chirp signal. This serves to confirm that the link between the base station 110 and the relay IOE device 130 is still alive.

At decision block 1310, the base station 110 checks a list of leaf IOE devices 120 that are associated with the relay IOE device 130 to identify whether there are any downlink pages in queue for the associated leaf IOE devices 120. If there are no downlink pages in queue for the associated leaf IOE devices 120, the method 1300 returns to block 1302 and continues as described above and below (e.g., the base station 110 monitors for a potential leaf list, a chirp, or an associated devices update signal).

If there is a downlink page in queue for a leaf IOE device 120, the method 1300 moves to block 1312.

At block 1312, the base station 110 sends a connection setup signal and downlink page signal to the relay IOE device 130 from which a chirp was received (e.g., at block 1302). The connection setup signal and downlink page signal are directed to a leaf IOE device 120 associated with the relay IOE device 130 (the leaf IOE device 120 determined at decision block 1310), and the transmission may contain instructions to the relay IOE device 130 to relay the signals on to the leaf IOE device 120. The relay IOE device 130 will then relay the page to the target leaf IOE device 120, e.g. during its own m-chirp/keep alive round.

The method 1300 then returns to block 1302 and continues as described above and below (e.g., the base station 110 monitors for a potential leaf list, a chirp, or an associated devices update signal).

Returning to block 1302, if an associated device update signal is received from a relay IOE device 130, the method 1300 moves to block 1316.

At block 1316, the base station 110 uses information contained in the associated device update signal to update a list of associations between relay IOE devices 130 that the base station serves and leaf IOE devices 120. For example, the associated device update signal may indicate that a link breakage occurred (e.g., a leaf IOE device 120 has lost association with a source relay IOE device 130). The associated device update signal may further indicate that the leaf IOE device 120 has, in response, reassociated with the relay IOE device 130 from which the base station 110 received the associated device update signal. The associated device update signal may further contain information identifying a source base station 110 that serves the source relay IOE device 130.

At block 1318, the base station 110 (also referred to as the target in FIG. 7) transmits a leaf IOE device update signal to the source base station 110 identified in the associated device update signal. The leaf IOE device update signal may inform the source base station 110 that the leaf IOE device 120 is no longer associated with the source relay IOE 130. The leaf IOE device update signal may include a request that any further downlink pages for the leaf IOE device 120 be forwarded to the (target) base station 110.

The method then returns to block 1302 and continues as described above and below (e.g., the base station 110 monitors for a potential leaf list, a chirp, or an associated devices update signal).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method comprising receiving, at a first wireless communications device, a chirp signal from a relay wireless communications device that serves as a relay for a second wireless communications device in a mesh network. The method further comprises determining, at the first wireless communications device, that a downlink page is pending for the second wireless communications device. The method further comprises sending, from the first wireless communications device to the relay wireless communications device, connection setup information and the downlink page in response to the determination.

The method further includes sending, in response to the chirp signal, a keep alive signal to the relay wireless communications device. The method further includes receiving, at the first wireless communications device prior to the receiving the chirp signal, a request for relay selection from a plurality of third wireless communications devices comprising the relay wireless communications device. The method further includes receiving, at the first wireless communications device prior to the receiving the chirp signal, a request for relay selection from a plurality of third wireless communications devices comprising the relay wireless communications device, and selecting, by the first wireless communications device, the relay wireless communications device from among the plurality of third wireless communications devices to serve as relay for the second wireless communications device. The method further includes sending, from the first wireless communications device, a relay selection signal to the relay wireless communications device identifying the relay wireless communications device as the determined relay for the second wireless communications device. The method further includes wherein the request for relay selection comprises discovery chirp signals and relay information from each of the plurality of third wireless communications devices and the selecting is based on information included in the discovery chirp signals and the relay information. The method further includes wherein the selecting is based on one or more parameters comprising: energy consumption to the first wireless communications device from the second wireless communications device, a number of intermediate relays to the first wireless communications device from the second wireless communications device, and whether wake-up periods of the relay wireless communications device overlap with wake-up periods of the second wireless communications device. The method further includes receiving, from the second wireless communications device, an uplink direct signal comprising a chirp signal based on the second wireless communications device determining that link breakage with the relay wireless communications device had occurred. The method further includes receiving, from a third wireless communications device that serves a target relay wireless communications device, an update identifying that the second wireless communications device has now associated with the target relay wireless communications device after determination of the link breakage.

Embodiments of the present disclosure further include an apparatus comprising a transceiver configured to receive a chirp signal from a relay wireless communications device that serves as a relay for a second wireless communications device in a mesh network. The apparatus further comprises a processor configured to determine that a downlink page is pending for the second wireless communications device, wherein the transceiver is further configured to send, to the relay wireless communications device, connection setup information and the downlink page in response to the determination.

The apparatus further includes wherein the transceiver is further configured to send, in response to the chirp signal, a keep alive signal to the relay wireless communications device. The apparatus further includes wherein the transceiver is further configured to receive, prior to the receiving the chirp signal, a request for relay selection from a plurality of third wireless communications devices comprising the relay wireless communications device. The apparatus further includes wherein the processor is further configured to select the relay wireless communications device from among the plurality of third wireless communications devices to serve as relay for the second wireless communications device. The apparatus further includes wherein the transceiver is further configured to send a relay selection signal to the relay wireless communications device identifying the relay wireless communications device as the determined relay for the second wireless communications device. The apparatus further includes wherein the request for relay selection comprises discovery chirp signals and relay information from each of the plurality of third wireless communications devices, and the processor is further configured to select the relay wireless communications device based on information included in the discovery chirp signals and the relay information. The apparatus further includes wherein the selecting is based on one or more parameters comprising: energy consumption to the apparatus from the second wireless communications device, a number of intermediate relays to the apparatus from the second wireless communications device, and whether wake-up periods of the relay wireless communications device overlap with wake-up periods of the second wireless communications device. The apparatus further includes wherein the transceiver is further configured to receive, from the second wireless communications device, an uplink direct signal comprising a chirp signal based on the second wireless communications device determining that link breakage with the relay wireless communications device had occurred. The apparatus further includes wherein the transceiver is further configured to receive, from a third wireless communications device that serves a target relay wireless communications device, an update identifying that the second wireless communications device has now associated with the target relay wireless communications device after determination of the link breakage.

Embodiments of the present disclosure further include a computer-readable medium having program code recorded thereon, the program code comprising code for causing a first wireless communication device to send a chirp signal to one or more second wireless communications devices in a mesh network during a first wake-up period. The program code further includes code for causing the first wireless communication device to receive a keep alive signal from a determined relay wireless communications device from among the one or more second wireless communications devices during the first wake-up period. The program code further includes code for causing the first wireless communication device to receive connection setup information from the determined relay wireless communications device during the first wake-up period, the connection setup information comprising resource allocation information.

The computer-readable medium further includes code for causing the first wireless communication device to receive, from the determined relay wireless communications device, a downlink page signal originating from a third wireless communications device. The computer-readable medium further includes code for causing the first wireless communication device to select the determined relay wireless communications device, and code for causing the first wireless communication device to send, to the determined relay wireless communications device, a relay selection signal during the first wake-up period. The computer-readable medium further includes wherein the selecting the determined relay wireless communications device is based on one or more parameters including: energy consumption to a third wireless communications device, a number of intermediate relays to a third wireless communications device, and whether wake-up periods of the determined relay wireless communications device overlap with wake-up periods of the first wireless communications device. The computer-readable medium further includes code for causing the first wireless communication device to send, to the determined relay wireless communications device, a second chirp signal at a first periodic rate during a second wake-up period, and code for causing the first wireless communication device to monitor for a second keep alive signal from the determined relay wireless communications device at a second periodic rate during the second wake-up period. The computer-readable medium further includes wherein the second chirp signal comprises an identifier for the first wireless communications device and an expected uplink traffic periodicity of the first wireless communications device. The computer-readable medium further includes code for causing the first wireless communication device to determine the first periodic rate based on an amount of overhead used to send the second chirp signal and an amount of mobility latency between the first wireless communications device and the determined relay wireless communications device. The computer-readable medium further includes code for causing the first wireless communication device to determine a link breakage to the determined relay wireless communications device has occurred in response to the transceiver failing to receive an expected second keep alive signal from the determined relay wireless communications device. The computer-readable medium further includes code for causing the first wireless communication device to send, to a target relay wireless communications device, in response to determining the link breakage, the second chirp signal, and code for causing the first wireless communication device to receive, from the target relay wireless communications device, a third keep alive signal and a second connection setup signal in response to the second chirp signal. The computer-readable medium further includes code for causing the first wireless communication device to choose the target relay wireless communications device from a list of one or more relay wireless communication devices, wherein the list is populated based on responses to the chirp signal. The computer-readable medium further includes code for causing the first wireless communication device to send, to a third wireless communications device, an uplink direct signal, the uplink direct signal including a chirp signal, and code for causing the first wireless communication device to receive, from the third wireless communications device, a fourth keep alive signal in response to the uplink direct signal. The computer-readable medium further includes code for causing the first wireless communication device to receive multiple third keep alive signals in response to each second chirp signal. The computer-readable medium further includes code for causing the first wireless communication device to receive, from the one or more second wireless communications devices, one or more second keep alive signals, and code for causing the first wireless communication device to select the determined relay wireless communications device based on information included in the one or more second keep alive signals. The computer-readable medium further includes wherein the chirp signal is a discovery chirp signal, and the program code further comprises code for causing the first wireless communication device to receive the keep alive signal in response to the discovery chirp signal. The computer-readable medium further includes code for causing the first wireless communication device to receive one or more discovery broadcast signals from the one or more second wireless communications devices during the first wake-up period, and code for causing the first wireless communication device to determine the determined relay wireless communications device based on information included in the one or more discovery broadcast signals. The computer-readable medium further includes code for causing the first wireless communication device to receive the one or more discovery broadcast signals prior to sending the chirp signal. The computer-readable medium further includes code for causing the first wireless communication device to send the chirp signal only to the determined relay wireless communications device. The computer-readable medium further includes code for causing the first wireless communication device to determine an expected uplink traffic periodicity of the first wireless communications device, and code for causing the first wireless communication device to include the expected uplink traffic periodicity in the chirp signal. The computer-readable medium further includes wherein the one or more discovery broadcast signals are received at a first periodic rate, and wherein the first wireless communications device moves out of a range of communication of one of the one or more relay wireless communications device at substantially the first periodic rate. The computer-readable medium further includes code for causing the first wireless communication device to send uplink traffic signals at a second periodic rate that is greater than the first periodic rate. The computer-readable medium further includes wherein the chirp signal is a discovery chirp signal, the discovery chirp signal is forwarded from the one or more relay wireless communications devices to a third wireless communications device, and the determined relay wireless communications device is selected from the one or more relay wireless communication devices at the third wireless communications device based on information included in the discovery chirp signal and information included by the one or more relay wireless communications devices. The computer-readable medium further includes wherein the determined relay wireless communications device is notified by the third wireless communications device to send the keep alive signal to the first wireless communications device. The computer-readable medium further includes code for causing the first wireless communication device to send uplink traffic signals at a first periodic rate, wherein the first wireless communications device moves out of a range of communication of one of the one or more relay wireless communications device at a second periodic rate that is greater than the first periodic rate. The computer-readable medium further includes code for causing the first wireless communication device to wait to send the chirp signal until there is an uplink traffic signal to send, and code for causing the first wireless communication device to send the chirp signal at a third periodic rate that is less than the first periodic rate.

Embodiments of the present disclosure further include a computer-readable medium having program code recorded thereon, the program code comprising code for causing a first wireless communication device to receive, from a second wireless communications device in a mesh network, a chirp signal in a wake-up period. The program code further includes code for causing the first wireless communication device to send, to the second wireless communications device, the keep alive signal during the wake-up period based on the first wireless communications device being a determined relay for the second wireless communications device. The program code further includes code for causing the first wireless communication device to send, to the second wireless communications device, connection setup information that comprises resource allocation information.

The computer-readable medium further includes code for causing the first wireless communication device to send, to the second wireless communications device, a downlink page signal originating from a third wireless communications device. The computer-readable medium further includes wherein the chirp signal comprises a discovery chirp signal from the second wireless communications device. The computer-readable medium further includes code for causing the first wireless communication device to generate a leaf list comprising the second wireless communications device, code for causing the first wireless communication device to send, to a third wireless communications device, the leaf list comprising the second wireless communications device, code for causing the first wireless communication device to receive, from the third wireless communications device, a relay selection signal from the third wireless communications device identifying the first wireless communications device as the determined relay for the second wireless communications device, and code for causing the first wireless communication device to send the connection setup information after receipt of the relay selection signal from the third wireless communications device. The computer-readable medium further includes code for causing the first wireless communication device to send the keep alive signal and the connection setup information in the same message. The computer-readable medium further includes code for causing the first wireless communication device to receive, after the chirp signal and the keep alive signal, a relay selection signal from the second wireless communications device identifying the first wireless communications device as the determined relay for the second wireless communications device, and code for causing the first wireless communication device to send the connection setup information after receipt of the relay selection signal from the second wireless communications device. code for causing the first wireless communication device to send, to the second wireless communications device, a discovery broadcast prior to the chirp signal, and code for causing the first wireless communication device to receive the chirp signal in response to the discovery broadcast. The computer-readable medium further includes wherein the chirp signal comprises identifying information of the second wireless communications device in response to the discovery broadcast, and an expected uplink traffic periodicity from the second wireless communications device. The computer-readable medium further includes code for causing the first wireless communication device to send the discovery broadcast according to a first periodic rate and the second wireless communications device moves out of a range of communication with the first wireless communications device at a second periodic rate. The computer-readable medium further includes wherein the first periodic rate is approximately equal to the second periodic rate. The computer-readable medium further includes code for causing the first wireless communication device to receive uplink traffic data at a third periodic rate, the third periodic rate being greater than the first periodic rate. The computer-readable medium further includes code for causing the first wireless communication device to receive the chirp at a first periodic rate and the second wireless communications device moves out of a range of communication with the first wireless communications device at a second periodic rate. The computer-readable medium further includes wherein the first periodic rate is less than the second periodic rate. The computer-readable medium further includes code for causing the first wireless communication device to monitor for a subsequent chirp signal from the second wireless communications device in a subsequent wake-up period according to a first periodic rate. The computer-readable medium further includes code for causing the first wireless communication device to send a subsequent keep alive signal based on receipt of the subsequent chirp signal at a second periodic rate. The computer-readable medium further includes wherein the second periodic rate is greater than the first periodic rate. The computer-readable medium further includes code for causing the first wireless communication device to determine a link breakage to the second wireless communications device has occurred in response to the transceiver failing to receive the subsequent chirp signal according to the first periodic rate. The computer-readable medium further includes The computer-readable medium further includes, code for causing the first wireless communication device to determine that a downlink page is pending for the second wireless communications device, and code for causing the first wireless communication device to send, to the relay wireless communications device, connection setup information and the downlink page in response to the determination. The computer-readable medium further includes code for causing the first wireless communication device to send, in response to the chirp signal, a keep alive signal to the relay wireless communications device. The computer-readable medium further includes code for causing the first wireless communication device to receive, prior to the receiving the chirp signal, a request for relay selection from a plurality of third wireless communications devices comprising the relay wireless communications device. The computer-readable medium further includes code for causing the first wireless communication device to select the relay wireless communications device from among the plurality of third wireless communications devices to serve as relay for the second wireless communications device. The computer-readable medium further includes code for causing the first wireless communication device to send a relay selection signal to the relay wireless communications device identifying the relay wireless communications device as the determined relay for the second wireless communications device. The computer-readable medium further includes wherein the request for relay selection comprises discovery chirp signals and relay information from each of the plurality of third wireless communications devices, and the program code further comprises code for causing the first wireless communication device to select the relay wireless communications device based on information included in the discovery chirp signals and the relay information. The computer-readable medium further includes wherein the selecting is based on one or more parameters comprising: energy consumption to the first wireless communications device from the second wireless communications device, a number of intermediate relays to the first wireless communications device from the second wireless communications device, and whether wake-up periods of the relay wireless communications device overlap with wake-up periods of the second wireless communications device. The computer-readable medium further includes code for causing the first wireless communication device to receive, from the second wireless communications device, an uplink direct signal comprising a chirp signal based on the second wireless communications device determining that link breakage with the relay wireless communications device had occurred. The computer-readable medium further includes code for causing the first wireless communication device to receive, from a third wireless communications device that serves a target relay wireless communications device, an update identifying that the second wireless communications device has now associated with the target relay wireless communications device after determination of the link breakage.

Embodiments of the present disclosure further include an apparatus comprising means for sending a chirp signal to one or more second wireless communications devices in a mesh network during a first wake-up period. The apparatus further comprises means for receiving a keep alive signal from a determined relay wireless communications device from among the one or more second wireless communications devices during the first wake-up period. The apparatus further comprises means for receiving connection setup information from the determined relay wireless communications device during the first wake-up period, the connection setup information comprising resource allocation information.

The apparatus further includes means for receiving, from the determined relay wireless communications device, a downlink page signal originating from a third wireless communications device. The apparatus further includes means for selecting the determined relay wireless communications device, and means for sending, to the determined relay wireless communications device, a relay selection signal during the first wake-up period. The apparatus further includes wherein the selecting the determined relay wireless communications device is based on one or more parameters including: energy consumption to a third wireless communications device, a number of intermediate relays to a third wireless communications device, and whether wake-up periods of the determined relay wireless communications device overlap with wake-up periods of the apparatus. The apparatus further includes means for sending, to the determined relay wireless communications device, a second chirp signal at a first periodic rate during a second wake-up period, and means for monitoring for a second keep alive signal from the determined relay wireless communications device at a second periodic rate during the second wake-up period. The apparatus further includes wherein the second chirp signal comprises an identifier for the apparatus and an expected uplink traffic periodicity of the apparatus. The apparatus further includes wherein the first periodic rate is determined based on an amount of overhead used to send the second chirp signal and an amount of mobility latency between the apparatus and the determined relay wireless communications device. The apparatus further includes means for determining a link breakage to the determined relay wireless communications device has occurred in response to failing to receive an expected second keep alive signal from the determined relay wireless communications device. The apparatus further includes means for sending, to a target relay wireless communications device, in response to determining the link breakage, the second chirp signal, and means for receiving, from the target relay wireless communications device, a third keep alive signal and a second connection setup signal in response to the second chirp signal. The apparatus further includes means for choosing the target relay wireless communications device from a list of one or more relay wireless communication devices, wherein the list is populated based on responses to the chirp signal. The apparatus further includes means for sending, to a third wireless communications device, an uplink direct signal, the uplink direct signal including a chirp signal, and means for receiving, from the third wireless communications device, a fourth keep alive signal in response to the uplink direct signal. The apparatus further includes wherein multiple third keep alive signals are received in response to each second chirp signal. The apparatus further includes means for receiving, from the one or more second wireless communications devices, one or more second keep alive signals, the selecting the determined relay wireless communications device being based on information included in the one or more second keep alive signals. The apparatus further includes wherein the chirp signal is a discovery chirp signal, and the apparatus receives the keep alive signal in response to the discovery chirp signal. The apparatus further includes means for receiving one or more discovery broadcast signals from the one or more second wireless communications devices during the first wake-up period, wherein determining the determined relay wireless communications device is based on information included in the one or more discovery broadcast signals. The apparatus further includes wherein the receiving the one or more discovery broadcast signals occurs prior to the sending the chirp signal. The apparatus further includes wherein the sending the chirp signal further comprises: means for sending the chirp signal only to the determined relay wireless communications device. The apparatus further includes means for determining an expected uplink traffic periodicity of the apparatus, and means for including the expected uplink traffic periodicity in the chirp signal. The apparatus further includes wherein the one or more discovery broadcast signals are received at a first periodic rate, and wherein the apparatus moves out of a range of communication of one of the one or more relay wireless communications device at substantially the first periodic rate. The apparatus further includes wherein the apparatus sends uplink traffic signals at a second periodic rate that is greater than the first periodic rate. The apparatus further includes wherein the chirp signal is a discovery chirp signal, the discovery chirp signal is forwarded from the one or more relay wireless communications devices to a third wireless communications device, and the determined relay wireless communications device is selected from the one or more relay wireless communication devices at the third wireless communications device based on information included in the discovery chirp signal and information included by the one or more relay wireless communications devices. The apparatus further includes wherein the determined relay wireless communications device is notified by the third wireless communications device to send the keep alive signal to the apparatus. The apparatus further includes wherein the apparatus sends uplink traffic signals at a first periodic rate, and the apparatus moves out of a range of communication of one of the one or more relay wireless communications device at a second periodic rate that is greater than the first periodic rate. The apparatus further includes means for waiting to send the chirp signal until there is an uplink traffic signal to send, the chirp signal being sent at a third periodic rate that is less than the first periodic rate.

Embodiments of the present disclosure further include an apparatus comprising means for receiving, from a second wireless communications device in a mesh network, a chirp signal in a wake-up period. The apparatus further comprises means for sending, to the second wireless communications device, a keep alive signal during the wake-up period based on the apparatus being a determined relay for the second wireless communications device. The apparatus further comprises means for sending, to the second wireless communications device, connection setup information that comprises resource allocation information.

The apparatus further includes means for sending, to the second wireless communications device, a downlink page signal originating from a third wireless communications device. The apparatus further includes wherein the chirp signal comprises a discovery chirp signal from the second wireless communications device. The apparatus further includes means for sending, to a third wireless communications device, a leaf list comprising the second wireless communications device, and means for receiving, from the third wireless communications device, a relay selection signal from the third wireless communications device identifying the apparatus as the determined relay for the second wireless communications device, wherein the sending the connection setup information occurs after receipt of the relay selection signal from the third wireless communications device. The apparatus further includes wherein the sending the keep alive signal and the connection setup information are performed together in the same message. The apparatus further includes means for receiving, after the chirp signal and the keep alive signal, a relay selection signal from the second wireless communications device identifying the apparatus as the determined relay for the second wireless communications device, wherein the sending the connection setup information occurs after receipt of the relay selection signal from the second wireless communications device. The apparatus further includes means for sending, to the second wireless communications device, a discovery broadcast prior to the chirp signal, wherein the chirp signal is received in response to the discovery broadcast. The apparatus further includes wherein the chirp signal comprises identifying information of the second wireless communications device in response to the discovery broadcast, and an expected uplink traffic periodicity from the second wireless communications device. The apparatus further includes wherein the sending the discovery broadcast is according to a first periodic rate and the second wireless communications device moves out of a range of communication with the apparatus at a second periodic rate. The apparatus further includes wherein the first periodic rate is approximately equal to the second periodic rate. The apparatus further includes wherein the apparatus receives uplink traffic data at a third periodic rate, the third periodic rate being greater than the first periodic rate. The apparatus further includes wherein the chirp is received at a first periodic rate and the second wireless communications device moves out of a range of communication with the apparatus at a second periodic rate. The apparatus further includes wherein the chirp is received at a first periodic rate and the second wireless communications device moves out of a range of communication with the apparatus at a second periodic rate. The apparatus further includes wherein the first periodic rate is less than the second periodic rate. The apparatus further includes means for monitoring for a subsequent chirp signal from the second wireless communications device in a subsequent wake-up period according to a first periodic rate. The apparatus further includes means for sending a subsequent keep alive signal based on receipt of the subsequent chirp signal at a second periodic rate. The apparatus further includes wherein the second periodic rate is greater than the first periodic rate. The apparatus further includes means for determining a link breakage to the second wireless communications device has occurred in response to failing to receive the subsequent chirp signal according to the first periodic rate.

Embodiments of the present disclosure further include an apparatus comprising means for receiving a chirp signal from a relay wireless communications device that serves as a relay for a second wireless communications device in a mesh network. The apparatus further comprises means for determining that a downlink page is pending for the second wireless communications device. The apparatus further comprises means for sending, to the relay wireless communications device, connection setup information and the downlink page in response to the determination.

The apparatus further includes means for sending, in response to the chirp signal, a keep alive signal to the relay wireless communications device. The apparatus further includes means for receiving, prior to the receiving the chirp signal, a request for relay selection from a plurality of third wireless communications devices comprising the relay wireless communications device. The apparatus further includes means for selecting the relay wireless communications device from among the plurality of third wireless communications devices to serve as relay for the second wireless communications device. The apparatus further includes means for sending a relay selection signal to the relay wireless communications device identifying the relay wireless communications device as the determined relay for the second wireless communications device. The apparatus further includes wherein the request for relay selection comprises discovery chirp signals and relay information from each of the plurality of third wireless communications devices, and the selecting is based on information included in the discovery chirp signals and the relay information. The apparatus further includes wherein the selecting is based on one or more parameters comprising: energy consumption to the apparatus from the second wireless communications device, a number of intermediate relays to the apparatus from the second wireless communications device, and whether wake-up periods of the relay wireless communications device overlap with wake-up periods of the second wireless communications device. The apparatus further includes means for receiving, from the second wireless communications device, an uplink direct signal comprising a chirp signal based on the second wireless communications device determining that link breakage with the relay wireless communications device had occurred. The apparatus further includes means for receiving, from a third wireless communications device that serves a target relay wireless communications device, an update identifying that the second wireless communications device has now associated with the target relay wireless communications device after determination of the link breakage.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method comprising:
sending, from a first wireless communications device, a chirp signal to one or more second wireless communications devices in a mesh network during a first wake-up period common to the first wireless communications device and to the one or more second wireless communications devices, the chirp signal indicating a request for a keep alive signal;
obtaining, at the first wireless communications device, a relay selection associated with a first relay wireless communications device;
receiving, at the first wireless communications device in response to the chirp signal, the keep alive signal from the first relay wireless communications device from among the one or more second wireless communications devices during the first wake-up period; and
receiving, at the first wireless communications device, connection setup information from the first relay wireless communications device during the first wake-up period, the connection setup information comprising resource allocation information,
wherein the first wireless communications device is asleep at a time that overlaps a sleep time of the one or more second wireless communications devices.

2. The method of claim 1, wherein the obtaining further comprises:
selecting, by the first wireless communications device, the first relay wireless communications device, and wherein the method further comprises:
sending, from the first wireless communications device to the first relay wireless communications device, a relay selection signal during the first wake-up period.

3. The method of claim 1, further comprising:
sending, from the first wireless communications device to the first relay wireless communications device, a second chirp signal at a first periodic rate during a second wake-up period; and
monitoring, by the first wireless communications device, for a second keep alive signal from the first relay wireless communications device at a second periodic rate during the second wake-up period.

4. The method of claim 3, further comprising:
determining, at the first wireless communications device, that a link breakage to the first relay wireless communications device has occurred in response to failing to receive an expected second keep alive signal from the first relay wireless communications device.

5. The method of claim 4, further comprising:
sending, from the first wireless communications device to a target relay wireless communications device, in response to determining the link breakage, a third chirp signal; and
receiving, at the first wireless communications device from the target relay wireless communications device, a third keep alive signal and a second connection setup signal in response to the third chirp signal.

6. The method of claim 2, further comprising:
receiving, by the first wireless communications device from the one or more second wireless communications devices, one or more second keep alive signals, the selecting the first relay wireless communications device being based on information included in the one or more second keep alive signals;
configuring the chirp signal as a discovery chirp signal to initiate an association with a relay wireless communications device; and
receiving the keep alive signal in response to the association.

7. The method of claim 2, further comprising:
receiving, at the first wireless communications device, one or more discovery broadcast signals from the one or more second wireless communications devices during the first wake-up period;
determining the first relay wireless communications device based on information included in the one or more discovery broadcast signals; and
receiving the one or more discovery broadcast signals occurs prior to the sending the chirp signal.

8. The method of claim 7, further comprising:
determining, by the first wireless communications device, an expected uplink traffic periodicity of the first wireless communications device; and
including, by the first wireless communications device, the expected uplink traffic periodicity in the chirp signal.

9. The method of claim 1, further comprising:
configuring the chirp signal as a discovery chirp signal; and
receiving the keep alive signal in response to a selection from a third wireless communication device of the first relay wireless communications device based on the discovery chirp signal.

10. A method, comprising:
receiving, at a first wireless communications device from a second wireless communications device in a mesh network, a chirp signal in a wake-up period, the chirp signal indicating a request for a keep alive signal;
sending, from the first wireless communications device to the second wireless communications device in response to the chirp signal, the keep alive signal during the wake-up period based on the first wireless communications device being a determined relay for the second wireless communications device; and
sending, from the first wireless communications device to the second wireless communications device, connection setup information that comprises resource allocation information.

11. The method of claim 10, wherein:
the chirp signal comprises a discovery chirp signal from the second wireless communications device, and
the chirp signal initiates an association with a relay wireless communications device.

12. The method of claim 11, further comprising:
sending, from the first wireless communications device to a third wireless communications device, a leaf list comprising the second wireless communications device; and
receiving, from the third wireless communications device, a relay selection signal from the third wireless communications device identifying the first wireless communications device as the determined relay for the second wireless communications device,
wherein the sending the connection setup information occurs after receipt of the relay selection signal from the third wireless communications device.

13. The method of claim 12, further comprising:
receiving, after the chirp signal and the keep alive signal, a relay selection signal from the second wireless communications device identifying the first wireless communications device as the determined relay for the second wireless communications device,
wherein the connection setup information is sent in response to the association after receipt of the relay selection signal from the second wireless communications device.

14. The method of claim 10, further comprising:
monitoring, by the first wireless communications device, for a subsequent chirp signal from the second wireless communications device in a subsequent wake-up period according to a first periodic rate.

15. The method of claim 14, further comprising:
sending, by the first wireless communications device, a subsequent keep alive signal based on receipt of the subsequent chirp signal at a second periodic rate.

16. The method of claim 14, further comprising:
determining, by the first wireless communications device, a link breakage to the second wireless communications device has occurred in response to failing to receive the subsequent chirp signal according to the first periodic rate.

17. An apparatus, comprising:
a processor configured to:
  generate a chirp signal; and
  obtain a relay selection associated with a first relay wireless communication device; and
a transceiver, coupled to the processor, configured to:
  send the chirp signal to one or more second wireless communications devices in a mesh network during a first wake-up period common to each device, the chirp signal indicating a request for a keep alive signal;
  receive, in response to the chirp signal, the keep alive signal from the first relay wireless communications device from among the one or more second wireless communications devices during the first wake-up period; and
  receive connection setup information from the first relay wireless communications device during the first wake-up period, the connection setup information comprising resource allocation information.

18. The apparatus of claim 17, wherein:
the processor is further configured to obtain the relay selection by selecting the first relay wireless communications device based on one or more of:
  an amount of energy consumption used to transmit from the apparatus to the first relay wireless communications device;
  whether wake-up periods of the apparatus overlap with wake-up periods of the first relay wireless communications device; and
  a number of intermediate relay wireless communications devices between the apparatus and a third wireless communications device; and
the transceiver is further configured to send, to the first relay wireless communications device, a relay selection signal during the first wake-up period.

19. The apparatus of claim 17, wherein the transceiver is further configured to:
send, to the first relay wireless communications device, a second chirp signal at a first periodic rate during a second wake-up period, and
monitor for a second keep alive signal from the first relay wireless communications device at a second periodic rate during the second wake-up period.

20. The apparatus of claim 19, wherein the processor is further configured to:
determine a link breakage to the first relay wireless communications device has occurred in response to the transceiver failing to receive an expected second keep alive signal from the first relay wireless communications device.

21. The apparatus of claim 20, wherein the transceiver is further configured to:
send, to a target relay wireless communications device, in response to determining the link breakage, the second chirp signal, and
receive, from the target relay wireless communications device, a third keep alive signal and a second connection setup signal in response to the second chirp signal.

22. The apparatus of claim 18, wherein:
the transceiver is further configured to receive, from the one or more second wireless communications devices, one or more second keep alive signals, and
the processor is further configured to obtain the relay selection by selecting the first relay wireless communications device based on information included in the one or more second keep alive signals.

23. The apparatus of claim 18, wherein:
the transceiver is further configured to receive one or more discovery broadcast signals from the one or more second wireless communications devices during the first wake-up period, and
the processor is further configured to obtain the relay selection by determining the first relay wireless communications device based on information included in the one or more discovery broadcast signals.

24. The apparatus of claim 17, wherein:
the chirp signal is a discovery chirp signal,
the discovery chirp signal is forwarded from the one or more second wireless communications devices to a third wireless communications device,
the first relay wireless communications device is selected from the one or more second wireless communication devices at the third wireless communications device based on information included in the discovery chirp signal and information included by the one or more second wireless communications devices, and
the processor is further configured to obtain the relay selection by receiving the keep alive signal.

25. An apparatus, comprising:
a processor configured to generate a keep alive signal; and
a transceiver configured to:
receive, from a second wireless communications device in a mesh network, a chirp signal in a wake-up period, the chirp signal indicating a request for the keep alive signal;
send, to the second wireless communications device in response to the chirp signal, the keep alive signal during the wake-up period based on the apparatus being a determined relay for the second wireless communications device; and
send, to the second wireless communications device, connection setup information that comprises resource allocation information.

26. The apparatus of claim 25, wherein:
the processor is further configured to generate a leaf list comprising the second wireless communications device, and
the transceiver is further configured to:
send, to a third wireless communications device, the leaf list comprising the second wireless communications device,
receive, from the third wireless communications device, a relay selection signal from the third wireless communications device identifying the apparatus as the determined relay for the second wireless communications device, and
send the connection setup information after receipt of the relay selection signal from the third wireless communications device.

27. The apparatus of claim 26, wherein the transceiver is further configured to:
receive, after the chirp signal and the keep alive signal, a relay selection signal from the second wireless communications device identifying the apparatus as the determined relay for the second wireless communications device, and
send the connection setup information after receipt of the relay selection signal from the second wireless communications device.

28. The apparatus of claim 25, wherein the transceiver is further configured to:
send, to the second wireless communications device, a discovery broadcast according to a first periodic rate prior to the chirp signal, wherein the second wireless communications device moves out of a range of communication with the apparatus at a second periodic rate,
receive the chirp signal in response to the discovery broadcast,
and
receive uplink traffic data at a third periodic rate, the third periodic rate being greater than the first periodic rate.

29. The apparatus of claim 25, wherein:
the transceiver is further configured to monitor for a subsequent chirp signal from the second wireless communications device in a subsequent wake-up period according to a first periodic rate, and
the processor is further configured to determine a link breakage to the second wireless communications device has occurred in response to the transceiver failing to receive the subsequent chirp signal according to the first periodic rate.

30. The apparatus of claim 29, wherein:
the transceiver is further configured to send a subsequent keep alive signal based on receipt of the subsequent chirp signal at a second periodic rate.

* * * * *